US010728739B2

(12) United States Patent
Abraham et al.

(10) Patent No.: US 10,728,739 B2
(45) Date of Patent: Jul. 28, 2020

(54) CONTROL PLANE BASED SMALL DATA SERVICE

(71) Applicant: QUALCOMM Incorporated, San Diego, CA (US)

(72) Inventors: Santosh Paul Abraham, San Diego, CA (US); Miguel Griot, La Jolla, CA (US); Sebastian Speicher, Wallisellen (CH); Haris Zisimopoulos, London (GB); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/128,127

(22) Filed: Sep. 11, 2018

(65) Prior Publication Data

US 2019/0090123 A1    Mar. 21, 2019

Related U.S. Application Data

(60) Provisional application No. 62/560,097, filed on Sep. 18, 2017.

(51) Int. Cl.
*H04W 8/18* (2009.01)
*H04W 52/02* (2009.01)
(Continued)

(52) U.S. Cl.
CPC ............ *H04W 8/18* (2013.01); *H04L 67/14* (2013.01); *H04L 69/04* (2013.01); *H04W 4/70* (2018.02);
(Continued)

(58) Field of Classification Search
CPC ..... H04W 8/18; H04W 8/02; H04W 52/0229; H04W 80/04; H04W 48/18; H04W 28/06; H04W 12/04; H04L 69/04
See application file for complete search history.

(56) References Cited

U.S. PATENT DOCUMENTS 10,462,840 B2 * 10/2019 Dao ................... H04W 76/10
2017/0339609 A1 * 11/2017 Youn .................. H04W 76/11
(Continued)

OTHER PUBLICATIONS

3rd Generation Partnership Project; Technical Specification Group Services and System Aspects; General Packet Radio Service (GPRS) Enhancements for Evolved Universal Terrestrial Radio Access Network (E-UTRAN) access (Release 15), 3GPP TS 23.401, 3rd Generation Partnership Project (3GPP), Mobile Competence Centre; 650, Route Des Lucioles; F-06921 Sophia-Antipolis Cedex; France, vol. SA WG2, No. V15.0.0, Jun. 12, 2017, pp. 1-386, XP051298391, [retrieved on Jun. 12, 2017].

(Continued)

*Primary Examiner* — Rasheed Gidado
(74) *Attorney, Agent, or Firm* — Nerrie M. Zohn

(57) ABSTRACT

A core network receives data from at least one of an Application Function (AF), a Data Network (DN), or a User Equipment (UE). A Session Management Function (SMF) processes the data for transport with a low overhead as a session management (SM) payload over a Non Access Stratum (NAS) protocol. The data may be received from an AF or DN external to the core network and may be processed to transport the data to the UE based as a SM payload. The data may be received as uplink data from a UE, e.g., in an SM payload. The SMF may processed the SM payload to obtain the data and may transport the data to the AF or DN. The SMF may perform IP header compression, data encryption based on an SMF encryption key, and/or buffering of data for a UE in an idle mode.

34 Claims, 18 Drawing Sheets

(51) Int. Cl.

| | |
|---|---|
| *H04L 29/06* | (2006.01) |
| *H04W 48/18* | (2009.01) |
| *H04W 28/06* | (2009.01) |
| *H04L 29/08* | (2006.01) |
| *H04W 28/02* | (2009.01) |
| *H04W 4/70* | (2018.01) |
| *H04W 12/00* | (2009.01) |
| *H04W 8/02* | (2009.01) |
| *H04W 12/04* | (2009.01) |
| *H04W 76/27* | (2018.01) |
| *H04W 80/04* | (2009.01) |

(52) U.S. Cl.
CPC ......... *H04W 8/02* (2013.01); *H04W 12/0013* (2019.01); *H04W 12/04* (2013.01); *H04W 28/0215* (2013.01); *H04W 28/06* (2013.01); *H04W 48/18* (2013.01); *H04W 52/0229* (2013.01); *H04L 67/12* (2013.01); *H04W 76/27* (2018.02); *H04W 80/04* (2013.01)

(56) References Cited

U.S. PATENT DOCUMENTS

| | | | | |
|---|---|---|---|---|
| 2018/0227826 | A1* | 8/2018 | Abraham | H04L 63/0457 |
| 2019/0007992 | A1* | 1/2019 | Kim | H04W 76/27 |
| 2019/0053295 | A1* | 2/2019 | Castellanos Zamora | ................... H04W 60/00 |
| 2019/0069199 | A1* | 2/2019 | Yan | H04W 28/12 |
| 2019/0150219 | A1* | 5/2019 | Wang | H04W 36/0033 370/329 |

OTHER PUBLICATIONS

3rd Generation Partnership Project; Technical Specification Group Services and System Aspects; Study on Architecture for Next Generation System (Release 14), 3GPP Standard; 3GPP TR 23.799, 3rd Generation Partnership Project (3GPP), Mobile Competence Centre; 650, Route Des Lucioles; F-06921 Sophia-Antipolis Cedex; France, vol. SA WG2, No. V14.0.0, Dec. 16, 2016, pp. 1-522, XP051230010, [retrieved on Dec. 16, 2016].

International Search Report and Written Opinion—PCT/US2018/050662—ISA/EPO—dated Nov. 20, 2018.

Qualcomm Inc: "5G IoT Next Steps in 3GPP," 3GPP Draft; S2-173043_CIOT_NEXT_STEPS-R7, 3rd Generation Partnership Project (3GPP), Mobile Competence Centre; 650, Route Des Lucioles; F-06921 Sophia-Antipolis Cedex; France, vol. SA WG2, No. Hangzhou; May 15, 2017-May 19, 2017, May 14, 2017, XP051281552, 26 pages, Retrieved from the Internet: URL: http://www.3gpp.org/ftp/Meetings_3GPP_SYNC/SA2/Docs/ [retrieved on May 14, 2017].

Qualcomm Incorporated: "NIDD Aspects for Small Data Transfer via NAS-SM," 3GPP Draft; S2-183991_PCR_23724_DATA_OVER_NAS_NIDD_ASPECTS-R2, 3rd Generation Partnership Project (3GPP), Mobile Competence Centre; 650, Route Des Lucioles; F-06921 Sophia-Antipolis Cedex; France, vol. SA WG2, No. Sanya, P.R. of China; Apr. 16, 2018-Apr. 20, 2018, Apr. 19, 2018, XP051432615, Retrieved from the Internet: URL: http://www.3gpp.org/ftp/Meetings%5F3GPP%5FSYNC/SA2/Docs [retrieved on Apr. 19, 2018].

* cited by examiner

CONTROL PLANE BASED SMALL DATA SERVICE

CROSS-REFERENCE TO RELATED APPLICATION

This application claims the benefit of U.S. Provisional Application Ser. No. 62/560,097, entitled "Control Plane Based Small Data Service" and filed on Sep. 18, 2017, the entire contents which are expressly incorporated by reference herein in their entirety.

BACKGROUND

Technical Field

The present disclosure relates generally to communication systems, and more particularly, to data delivery over a core network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

A focus of the traditional LTE design relates to the improvement of spectral efficiency, ubiquitous coverage, and enhanced quality of service (QoS) support, etc. Current LTE system down link (DL) and uplink (UL) link budgets may be designed for coverage of high end devices, such as state-of-the-art smartphones and tablets. However, it may be desirable to support low cost low rate devices as well. Such communication may involve a reduction in a maximum bandwidth, e.g., a narrowband bandwidth, use of a single receive radio frequency (RF) chain, a reduction in peak rate, a reduction in transmit power, the performance of half duplex operation, etc. One example of such narrowband wireless communication is Narrowband-Internet of Things (NB-IoT), which may be limited to a single RB of system bandwidth, e.g., 180 kHz. Another example of narrowband wireless communication is enhanced machine type communication (eMTC), which may be limited to six RBs of system bandwidth.

Narrowband wireless communication involves unique challenges due to the limited frequency dimension of the narrow band. Additionally, low power operation may be very important for such low complexity devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In Cellular Internet of Things (CIoT) small amounts of data may need to be transferred via a core network to a User Equipment (UE). This may include infrequent small data transfers and/or frequent small data transfers.

Aspects presented herein provide for transport of small data to the UE via a control plane of the core network in a manner that may reduce connection set up requirements for the UE and the network in order to communicate such small data to the UE. The data may be transported as a Session Management (SM) payload from a Small Data Capable Session Management Function (SDC-SMF) at the core network. At a core network, data ingress for Non-IP Data Delivery (NIDD) may use a T8 reference point. The SDC-SMF may terminate a T8 interface by which an Application Function (AF) introduces data into the core network. In another example, a Network Exposure Function (NEF) may terminate a T8 interface with an AF. The SDC-SMF may be configured to store and forward small data towards a UE. For example, the SDC-SMF may be configured to buffer small data while a UE is in an idle mode and to forward the small data toward the UE when the UE is awake. The SDC-SMF may enable the SMF to manage Quality of Service (QoS) for a small data stream. The SDC-SMF may be configured to perform Internet Protocol (IP) compression, e.g., IP header compression, for small data IP streams. The SDC-SMF may also encrypt data with SMF specific encryption keys. The SDC-SMF may also protect the integrity of the data with SMF specific integrity-protection keys. The SMF specific encryption and/or integrity protection keys may be the shared keys between the UE and the SMF.

In an aspect of the disclosure, a method, a computer-readable medium, and an apparatus are provided. The apparatus receives data from at least one of an AF, a DN, or a UE. The apparatus processes the data at an SMF for transport with a low overhead as a session management payload over an NAS protocol. The data may be received from the AF or the DN, and the apparatus may transport the data from the SMF to the user equipment based on a SM payload. The data may be received from the UE as an SM payload, and the apparatus may transport the data to the AF or the DN.

In another aspect, a method, a computer-readable medium, and an apparatus are provided for wireless communication at a user equipment. The apparatus establishes a session with an SMF and communicates data with at least one of an SF or a DN, wherein the data is communicated with the SMF for transport with a low overhead as SM payload over a NAS protocol. For example the apparatus may receive the data from the AF or the DN based on the SM payload received from the SMF. In another example, the apparatus may transmit the data to the SMF based on a SM payload for transport to the AF or the DN.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
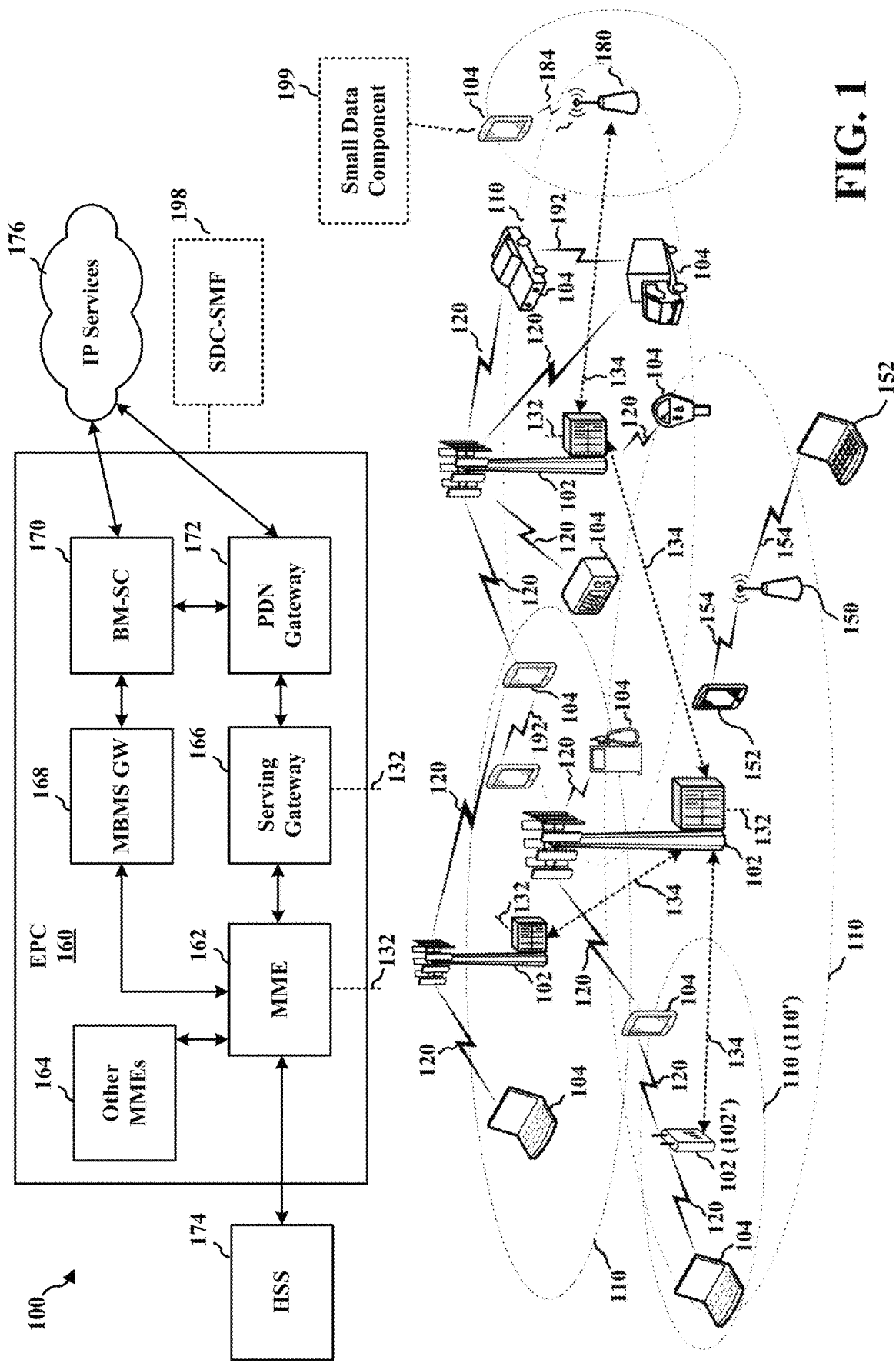
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a core network, e.g., network 160, may include an SMF capable of processing and communicating small data between UE 104 and an AF or DN external to the network (e.g., SDC-SMF 198), such as described in connection with FIGS. 4-18. In other aspects, UE 104 may comprise a small data component 199 configured to communicate small data with an AF or DN based on an SM payload, as described in connection with FIGS. 4-18.

Figure 2:
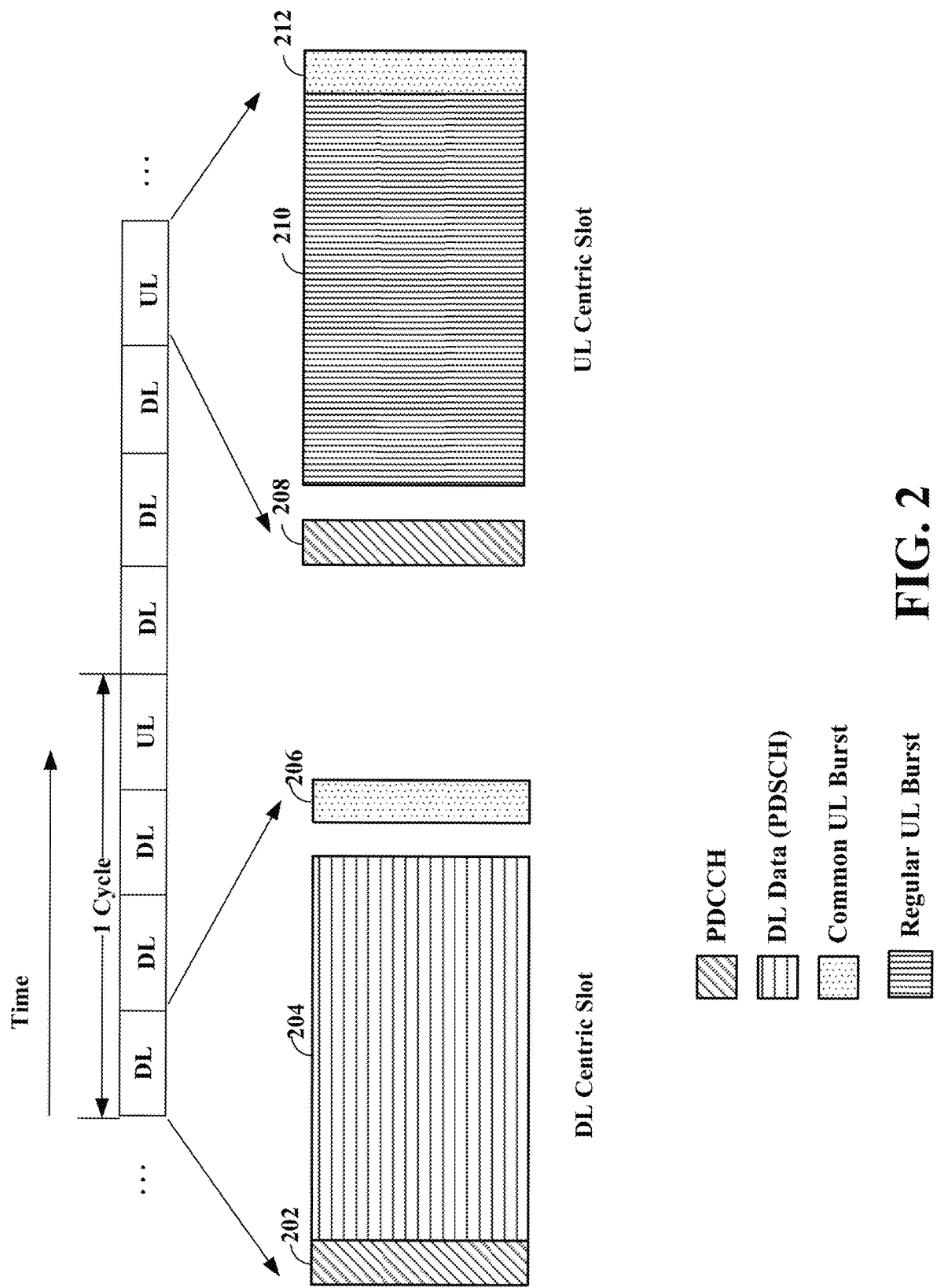
FIG. 2 illustrates an example slot structure for UL centric slots and DL centric slots.

FIG. 2 illustrates an example slot structure comprising DL centric slots and UL centric slots. In NR, a slot may have a duration of 0.5 ms, 0.25 ms, etc., and each slot may have 7 or 14 symbols. A resource grid may be used to represent the time slots, each time slot including one or more time concurrent resource blocks (RBs) (also referred to as physical RBs (PRBs)). The resource blocks for the resource grid may be further divided into multiple resource elements (REs). The number of bits carried by each RE depends on the modulation scheme.

A slot may be DL only or UL only, and may also be DL centric or UL centric. FIG. 2 illustrates an example DL centric slot. The DL centric slot may comprise a DL control region 202, e.g., in which in which physical downlink control channel (PDCCH) is transmitted. Some of the REs of the DL centric slot may carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS).

A physical broadcast channel (PBCH) may carry a master information block (MIB). The MIB provides a number of RBs in the DL system bandwidth, a PHICH configuration, and a system frame number (SFN). The DL centric slot may comprise a DL data region 204, e.g., in which a physical downlink shared channel (PDSCH) carries user data, broadcast system information not transmitted through the PBCH such as system information blocks (SIBs), and paging messages.

The DL centric slot may also comprise a common UL burst region (ULCB) 206 in which UEs may send UL control channel information or other time sensitive or otherwise critical UL transmissions.

For example, the UE may additionally transmit sounding reference signals (SRS). The SRS may be used by an eNB for channel quality estimation to enable frequency-dependent scheduling on the UL. A physical random access channel (PRACH) may be included within one or more slots within a slot structure based on the PRACH configuration. The PRACH allows the UE to perform initial system access and achieve UL synchronization. Additionally, the common UL burst 206 may comprise a physical uplink control channel (PUCCH) that carries uplink control information (UCI), such as scheduling requests, a channel quality indicator (CQI), a precoding matrix indicator (PMI), a rank indicator (RI), and HARQ ACK/NACK feedback.

Similar to the DL centric slot, the UL centric slot may comprise a DL control region 208, e.g., for PDCCH transmissions. The DL control region 202, 208 may comprise a limited number of symbols at the beginning of a slot. The UL centric slot may comprise an UL data region 210, e.g., for the transmission of a Physical Uplink Shared Channel (PUSCH) that carries data, and may additionally be used to carry a buffer status report (BSR), a power headroom report (PHR), and/or UCI. The UL data region 210 may be referred to as a UL regular burst (ULRB) region. The UL centric slot may also comprise a common UL burst region (ULCB) 212 similar to that of the DL based slot 206.

The UL centric slot may comprise a guard band between the UL data region 210 and the ULCB 212. For example, the guard band may be based on the eNB's capabilities and used to reduce interference when the UL data region 210 and the ULCB have different numerologies (symbol periods, slot lengths, etc.). The DL control region 202, 208 may comprise a limited number of symbols at the beginning of a slot and the ULCB region may comprise one or two symbols at the end of the slot, for both the DL centric and the UL centric slots. Resource management of PUSCH or PUCCH transmissions in the ULRB may be similar to that PUSCH or PUCCH for LTE. However, where LTE may be primarily driven by a SC-FDM waveform, NR may be based on an SC-FDM or OFDM waveform in the ULRB 210.

Figure 3:
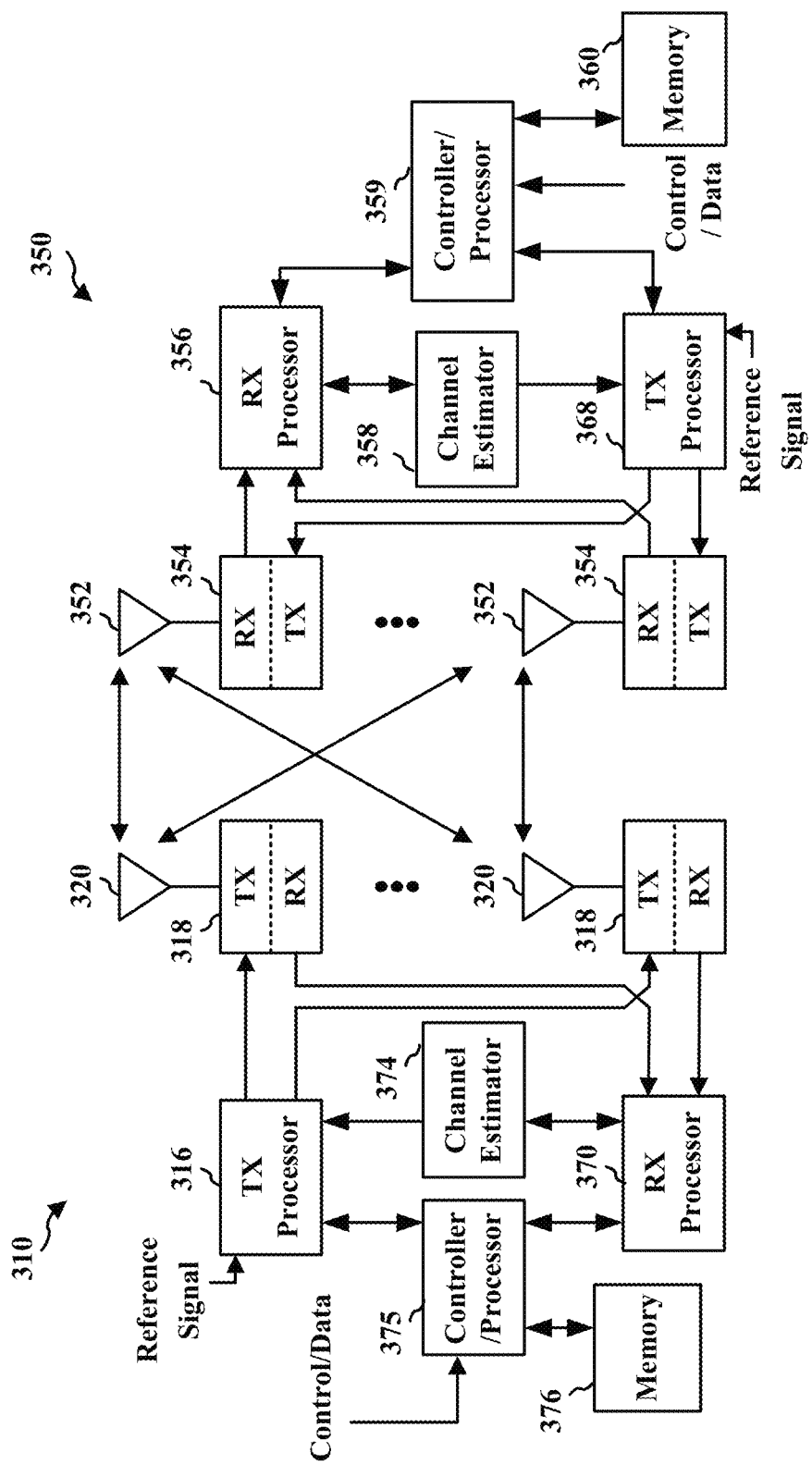
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

It may be desirable to support low cost low rate devices. Such communication may involve a reduction in a maximum bandwidth, e.g., a narrowband bandwidth, use of a single receive radio frequency (RF) chain, a reduction in peak rate, a reduction in transmit power, the performance of half duplex operation, etc. One example of such narrowband wireless communication is Narrowband-Internet of Things (NB-IoT), which may be limited to a single RB of system bandwidth, e.g., 180 kHz. Another example of narrowband wireless communication is enhanced machine type communication (eMTC), which may be limited to six RBs of system bandwidth.

Narrowband wireless communication involves unique challenges due to the limited frequency dimension of the narrow band. Additionally, low power operation may be very important for such low complexity devices.

In Cellular Internet of Things (CIoT) small amounts of data may need to be transferred via a core network to a user equipment. This may include infrequent small user data transfers and/or frequent small user data transfers. Small user data may comprise small amounts of data having a size below a threshold. Such data may comprise user data in contrast to control or measurement communication. Small user data may comprise, e.g., a data stream having relatively infrequent and/or short lived sporadic burst transmissions of data for which the overhead requirements of a conventional link set up protocol would be large relative to the amount of data to be conveyed. In one example, small data may have a size below 100 bytes and/or may have a data rate below 100 kbps. For example, an electricity meter or a water meter may monitor and report data about electricity usage or water usage. The meters may periodically transmit small amounts of data to a network, e.g., reporting the monitored electrical or water information. In another example, the small data may comprise information from collected at a sensor. The data comprises user data rather than control information or control measurements from a UE.

In an example, the small user data may be a 50 byte packet. If the 50 byte packet is handled in the same manner as larger data packets, then a significant amount of communication must be performed to establish a connection, open radio bearers, establish security, etc. in preparation to send the data. The communication required in preparation to send the user data to a UE may include hundreds of bytes of data, whereas the user data itself may be only 50 bytes or less. The large overhead requirement in comparison to the small user data places a significant burden on both the core network and the UE. An AF, a DN, or a UE may send small data messages in a periodic manner, e.g., once every hour. The overhead requirement grows with the periodic communication of such small data, because the overhead signaling must be performed for each periodic communication. Furthermore, the network may support a large number of devices that communicate small data, thereby amplifying the overhead burden.

Both a UE and a network may benefit from leveraging an idle mode as much as possible. Additional benefits may be derived through a reduction in connection set up requirements for small data transfers. It may also be helpful to minimize, or otherwise reduce, context storage requirements at RAN nodes.

At a core network, data ingress for Non-IP Data Delivery (NIDD) may use a T8 reference point, in one example. This may minimize impact to service due to inter-RAT or Inter-Core Network (Inter-CN) mobility by the UE.

In order to provide such benefits to the UE and the network, small data frames may be carried over a control plane. As described above, small amounts of data may be transmitted in a periodic or infrequent manner. As one example, a sensor may transmit measurement data in an infrequent or periodic manner. Small data may comprise data that meets a size threshold, such as being below a size threshold. In one example, the size threshold may be, e.g., 64 octet. Thus, data that is less than 64 octet may be carried over the control plane, as presented herein, in a manner that reduces the overhead burden to communicate the data. In another example, as described above, a threshold for small data may comprise 100 bytes and/or a data rate of 100 kbps. In this example, small data having a size below 100 bytes and/or having a data rate below 100 kbps may be carried over the control plane. If the data is larger than the size threshold for small data, e.g., the data may be communicated in another manner, e.g., using the normal signaling overhead. The examples of 64 octet, 100 bytes, and/or 100 kbps are merely examples of a size threshold for small data. The size threshold for data to be transported as small data over the control plane may also be set at a different size.

Figure 4:
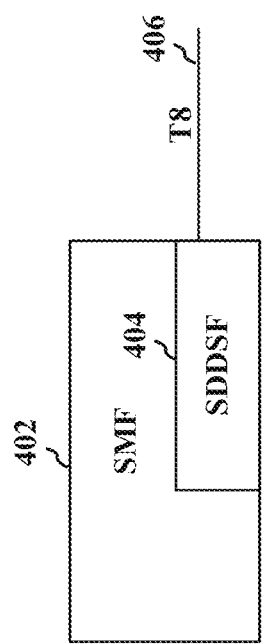
FIG. 4 is a diagram illustrating an SDC-SMF.
Figure 5:
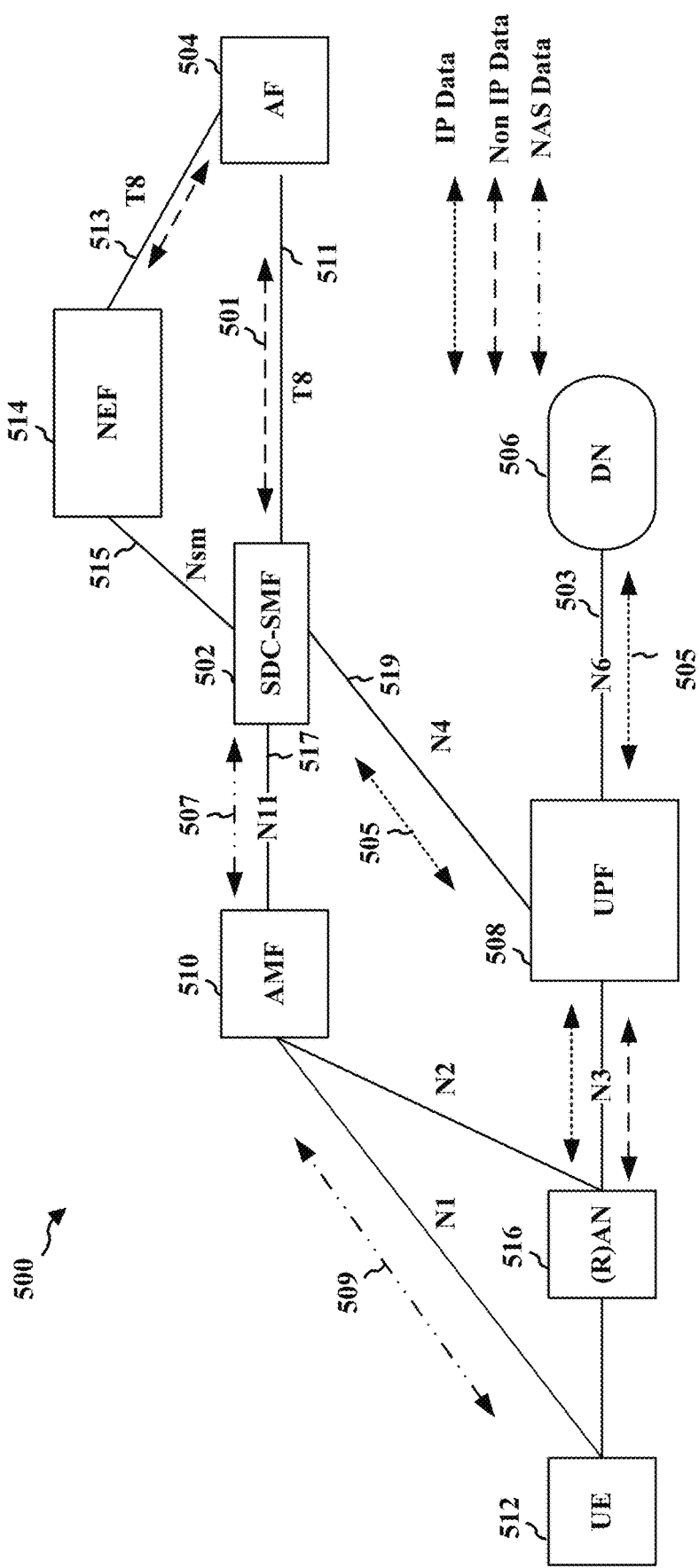
FIG. 5 is an example network architecture having a data delivery path comprising an SDC-SMF.

Architectural changes may be made to configure an SMF and other control plane entities to support small data transport. FIG. 4 illustrates an enhanced SMF 402 configured to include a small data delivery service function (SDDSF) 404. The Small Data Capable SMF (SDC-SMF) enables small data transfer over a NAS. The SDDSF may provide enhanced capabilities to the SMF. In one example, the SMF may terminate a T8 interface 406 for small data, e.g., from an AF. As illustrated in FIG. 5, in other examples, the NEF may terminate the T8 interface from the AF, and may have an interface, e.g., an Nsm interface, to the SMF. The SDDSF may enable the SMF to store and forward small data towards a UE. For example, the SMF may be configured to buffer small data while a UE is in an idle mode and to forward the small data toward the UE when the UE is awake. The SDDSF may enable the SMF to manage QoS for a small data stream. The SDDSF may be configured to perform IP header compression, e.g., IP header compression, for small data IP streams. The SDDSF may also encrypt data with SMF specific encryption keys. These encryption keys may be provided by an AF, e.g. rather than from a UE network service subscription.

Figure 9:
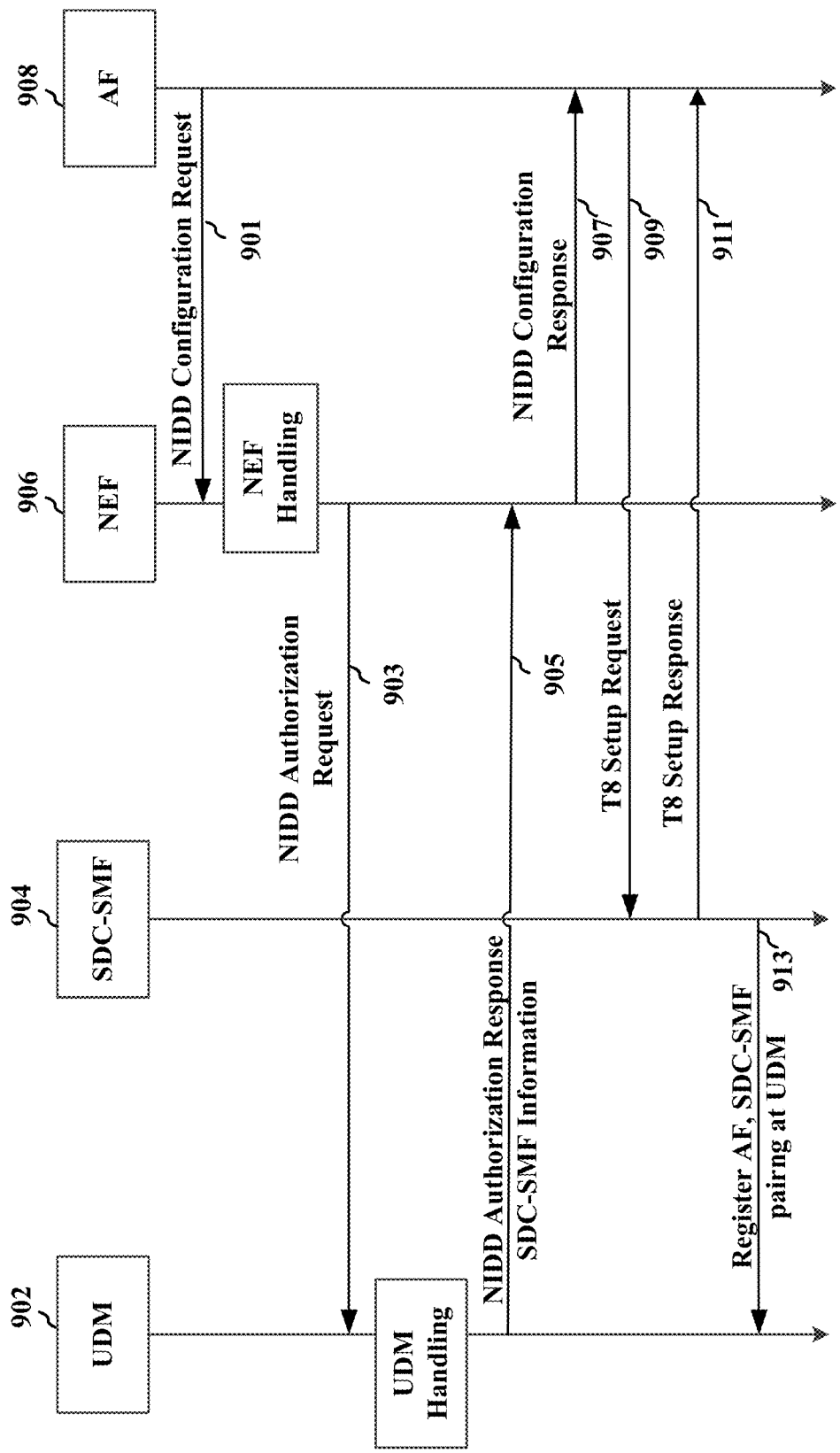
FIG. 9 illustrates an example communication flow for NIDD through an SDC-SMF.
Figure 10:
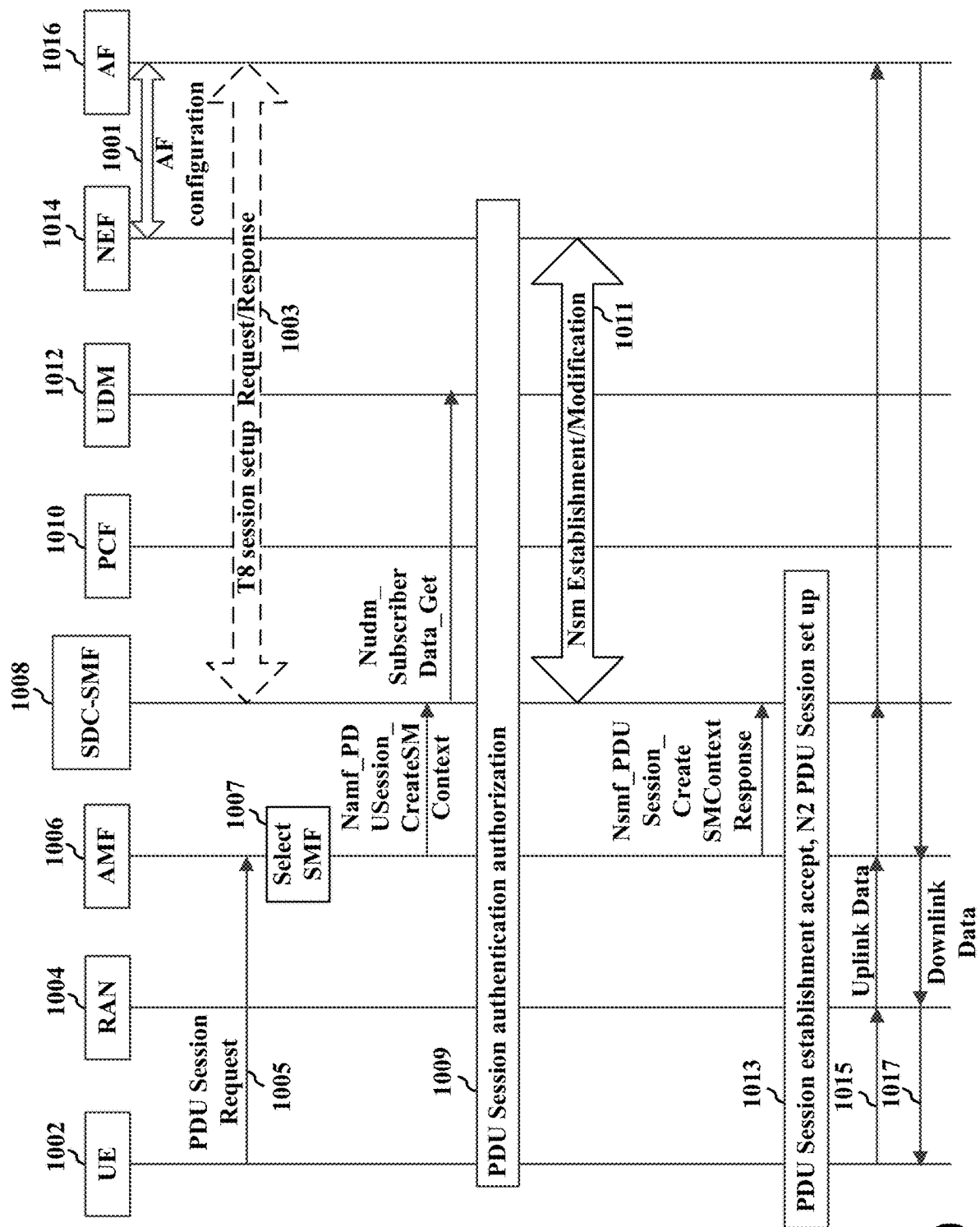
FIG. 10 illustrates an example communication flow for NIDD connection set-up

FIG. 5 illustrates an example network architecture 500 having a data delivery path that comprises an SDC-SMF 502. The network architecture 500 may comprise a 5G NR network having a control plane and a user plane. As illustrated in FIG. 5, Mobile Terminated (MT) NIDD data 501 may enter the core network, e.g., from an AF 504 external to the network, and may be processed at a SDC-SMF 502 for transport to the UE 512 over the control plane. In one example, the data may enter the core network through a T8 interface from the AF 504 that terminates at the SDC-SMF 502. Thus, SDC-SMF may provide an ingress point for data from the AF. As illustrated in FIG. 5, the NEF 514 may also terminate a T8 interface from the AF 504 and may have an interface, e.g., an Nsm interface, to the SDC-SMF. Although only a single AF 504 is illustrated in FIG. 5, any number of AFs may transport data to various user equipment via the core network. An example set up procedure linking the AF 504 to an SDC-SMF 502 is illustrated in FIGS. 9 and 10, e.g., via the T8 interface 511 directly from AF 504 to SDC-SMF 502 or indirectly via the T8 interface 513 from the AF 504 to the NEF 514 that then connects via interface 515 to the SDC-SMF 502. Mobile Terminated (MT) IP Data Delivery (IPDD) data 503 may enter the core network via a Data Network (DN) 506, e.g., via an N6 interface. The User Plane Function (UPF) 508 that receives the IPDD 503 may forward the data 505 to the SDC-SMF 502, e.g., via an N4 interface 519. IP compression, e.g., IP header compression, may be performed at the SDC-SMF 502. Thus, the SDC-SMF 502 may receive data from the AF 504 or the DN 506 and may process the data for transport to the UE 512. The data 501, 505 may be placed in an NAS SM message payload 507 and sent to the AMF 510 via an interface 517, whether the data is NIDD 501 coming into the core network from an AF 504 or the data is IPDD 503 coming into the core network from a DN 506. The data 509 may then be forwarded as a NAS SM message payload to the UE 512 from the Core Access and Mobility Management Function (AMF) 510. FIG. 5 also illustrates example interfaces between a Network Exposure Function (NEF) 514 and the SDC-SFM 502 and AF 504. Thus, as illustrated in FIG. 5, the NEF 514 may provide a T8 termination for data entering the core network from AF 504 and may have an interface 515 that connects to SDC-SMF, which processes the data to be sent to UE 512 as a NAS SM payload via AMF 510. As well, an interface 503 is illustrated between the UPF 508 and the UE 512 and a Radio Access Network (RAN) 516.

The SDC-SMF 502 may also protect the integrity of the data with SMF specific integrity-protection keys. The SMF specific encryption and/or integrity protection keys are the shared keys between the UE 512 and the SDC-SMF 502.

Although this example has been described for data received from an AF 504 or DN 506 and transmitted to a UE 512, the SDC-SMF 502 may similarly receive small data from UE 512, e.g., as an SM payload. FIG. 10 illustrates an example communication flow showing both uplink and downlink small data transmissions. The SDC-SMF 502 may process the SM payload received from the UE 512, e.g., via AMF 510, to obtain the data and to provide the data to the AF 504 or the DN 506. In this example, the SDC-SMF 502 may perform IP header decompression for data received from the UE, whereas the SDC-SMF may perform IP header compression for data that is being prepared to be sent to the UE.

The handling of small data by an SDC-SMF has a number of advantages. For example, SMF functions, such as control rate, can be leveraged for Control Plane (CP) data. Additionally, AMF functionality is largely unmodified. For example, the AMF 510 may simply forward data payload frames to the SMF. The processing of the data may be performed by the SMF 502, e.g., based on the SDDSF 404, described in FIG. 4. This may provide an easier transition between IP data (IPD) over the control plane to user plane data.

Figure 6:
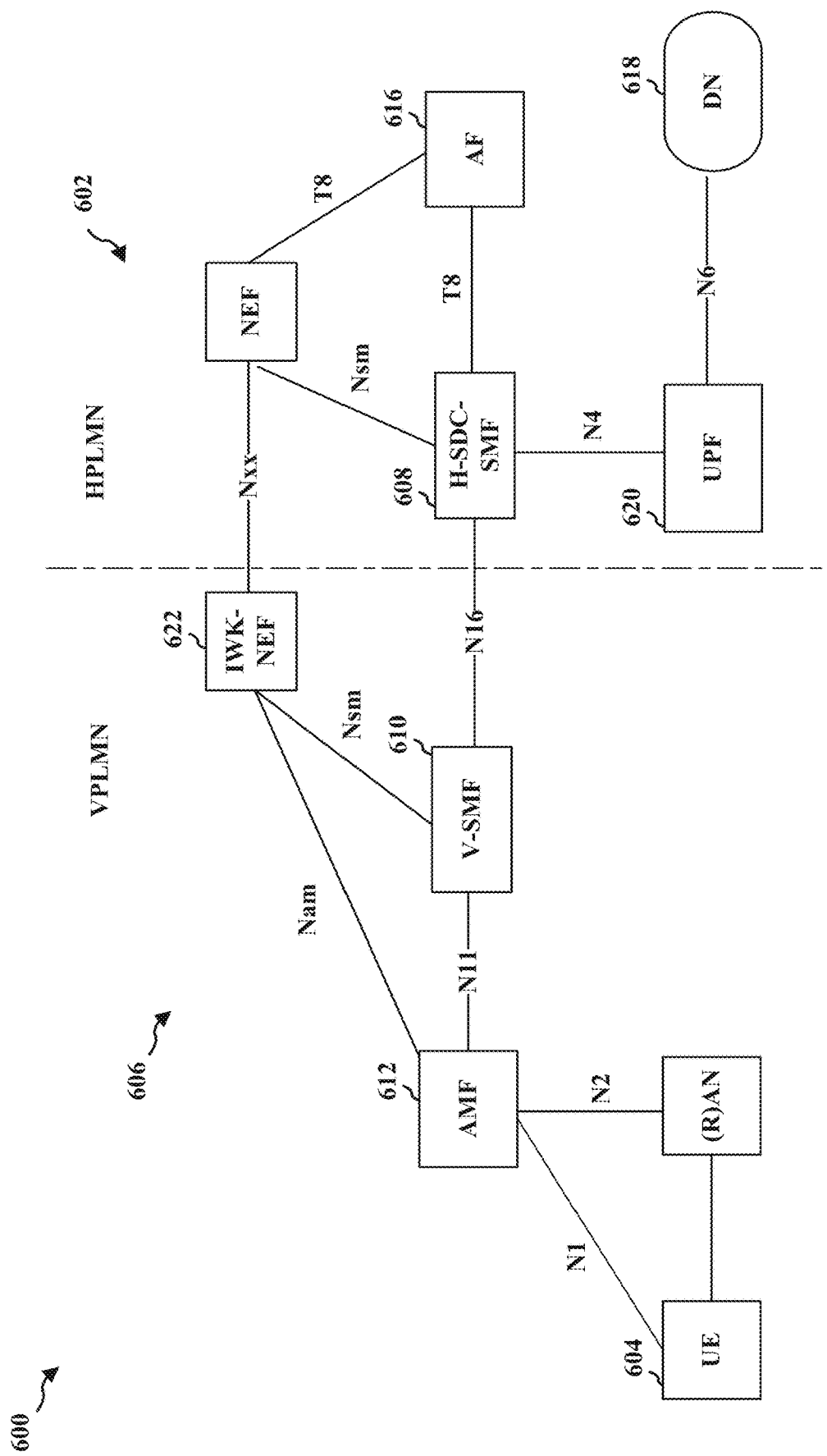
FIG. 6 illustrates an example roaming network architecture having a data delivery path comprising an SDC-SMF.

In FIG. 5, the architecture illustrates data transport by a home SMF. FIG. 6 illustrates an example of a roaming architecture having a Home Public Land Mobile Network (HPLMN) 602 for a UE 604 that is located within a Visited Public Land Mobile Network (VPLMN) 606. In the HPLMN, a Home SDC-SMF (H-SDC-SMF) 608 may receive data from AF 616, as described in connection with SDC-SMF 502. Similarly, H-SDC-SMF 608 may perform IP header compression for IP data forwarded by UPF 620 from DN 618. The H-SDC-SMF 608 may process and store the data received from the AF 616 or the DN 618. Then, the H-SDC-SMF 608 may forward the processed data to Visited-SDC-SMF (V-SMF) 610. Thus, the V-SMF may be configured with minimal additional functionality for CIoT. For example, the V-SMF might not have at least some of the additional functionality of an SDC-SMF 502. The V-SMF 610 may select the H-SDC-SMF 608. The V-SMF may receive data processed by the H-SDC-SMF 608 and add the data to an SM payload that is forwarded to the AMF 612 for transport to UE 604. IP data may be sent to H-SDC-SMF 608 and forwarded to the UE 604 after header compression, e.g., over N16. Interworking-NEF (IWK-NEF) 622 may aggregate functions that can be exposed to the HPLMN 602.

Figure 12:
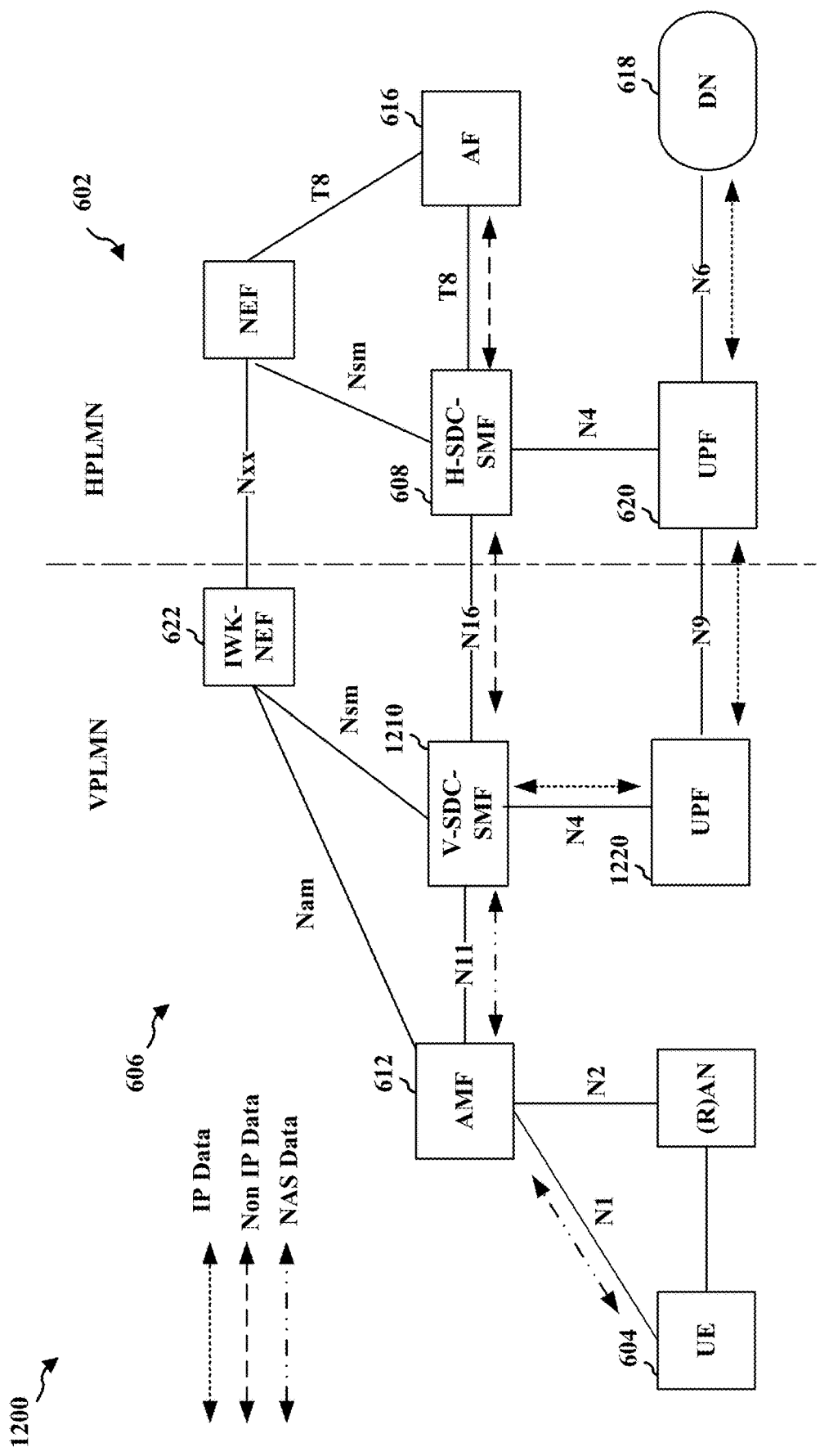
FIG. 12 illustrates an example roaming network architecture having a data delivery path comprising an SDC-SMF.

In another example, the V-SMF 610 may comprise a V-SDC-SMF. FIG. 12 illustrates an example roaming architecture 1200 similar to FIG. 6 and having a V-SDC-SMF 1210. Similar aspects to FIG. 6 have been marked with the same reference numbers. The V-SDC-SMF 1210 may perform IP header compression in addition to the encryption and integrity check described for FIG. 6. The V-SDC-UPF 1210 may also store small data for UEs in idle mode and forward the small data when the UE is awake. Also, as illustrated in FIG. 12, a home UPF 620 may communicate data over an N9 interface with visited UPF 1220 that forwards the data to V-SDC-SMF 1210 for forwarding to the UE 604.

Figure 7:
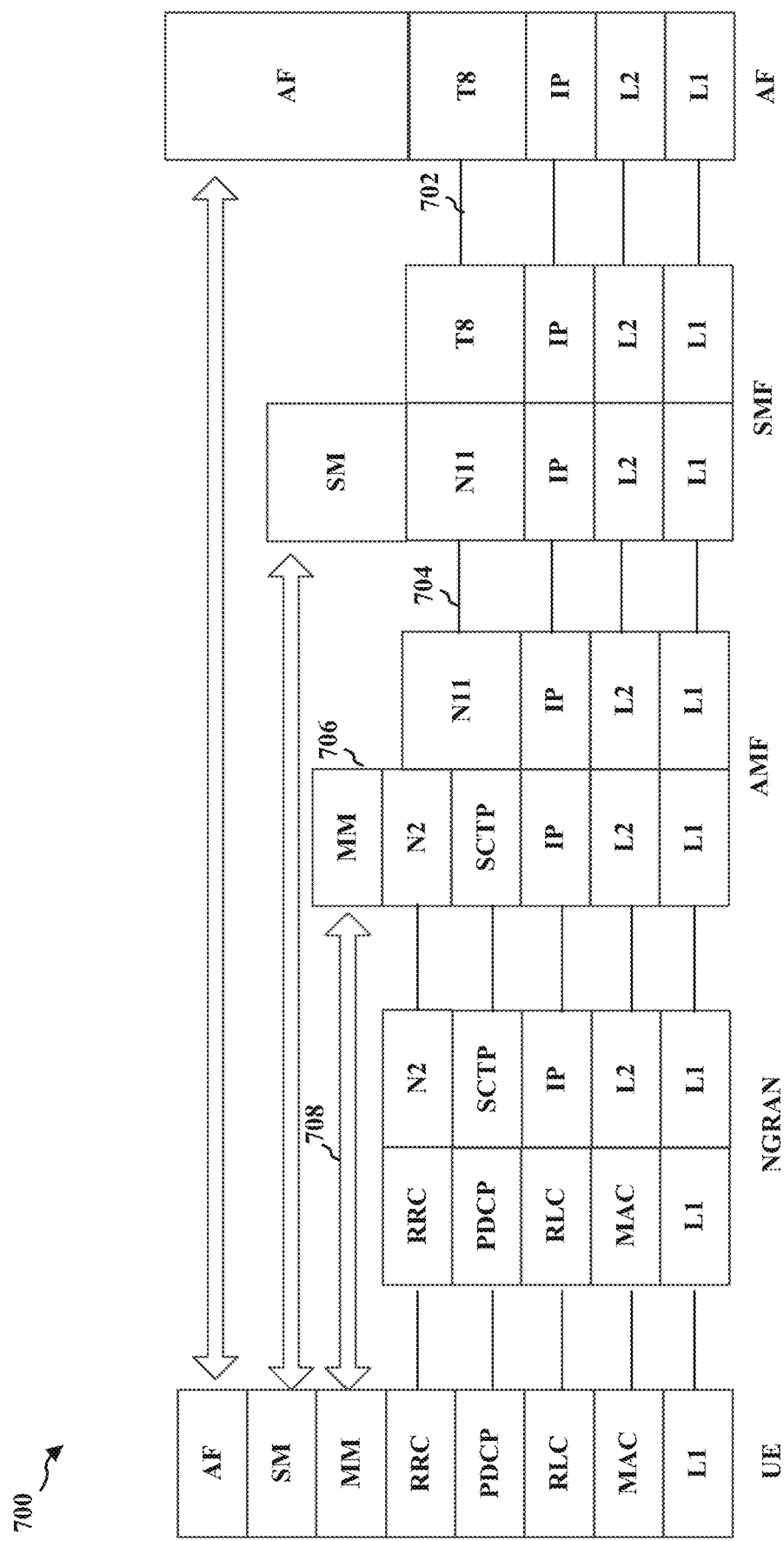
FIG. 7 illustrates an example Non-Internet Protocol Data Delivery (NIDD) protocol stack for data delivery through an SDC-SMF.

FIG. 7 illustrates an example NIDD protocol stack 700 for transporting NIDD through SDC-SMF, (e.g., SDC-SMF 402, 502, 608). FIG. 7 illustrates an example in which data frames may be delivered to the SDC-SMF from the AF, e.g., via a T8 interface 702. The SDC-SMF may package the data frames as NAS payload in a Session Management (SM) message that is forwarded to the AMF, e.g., via an N11 interface 704. The AMF then forwards the NAS payload to the UE, e.g., in a Mobility Management (MM) message 708 from an MM protocol 706.

Figure 8:
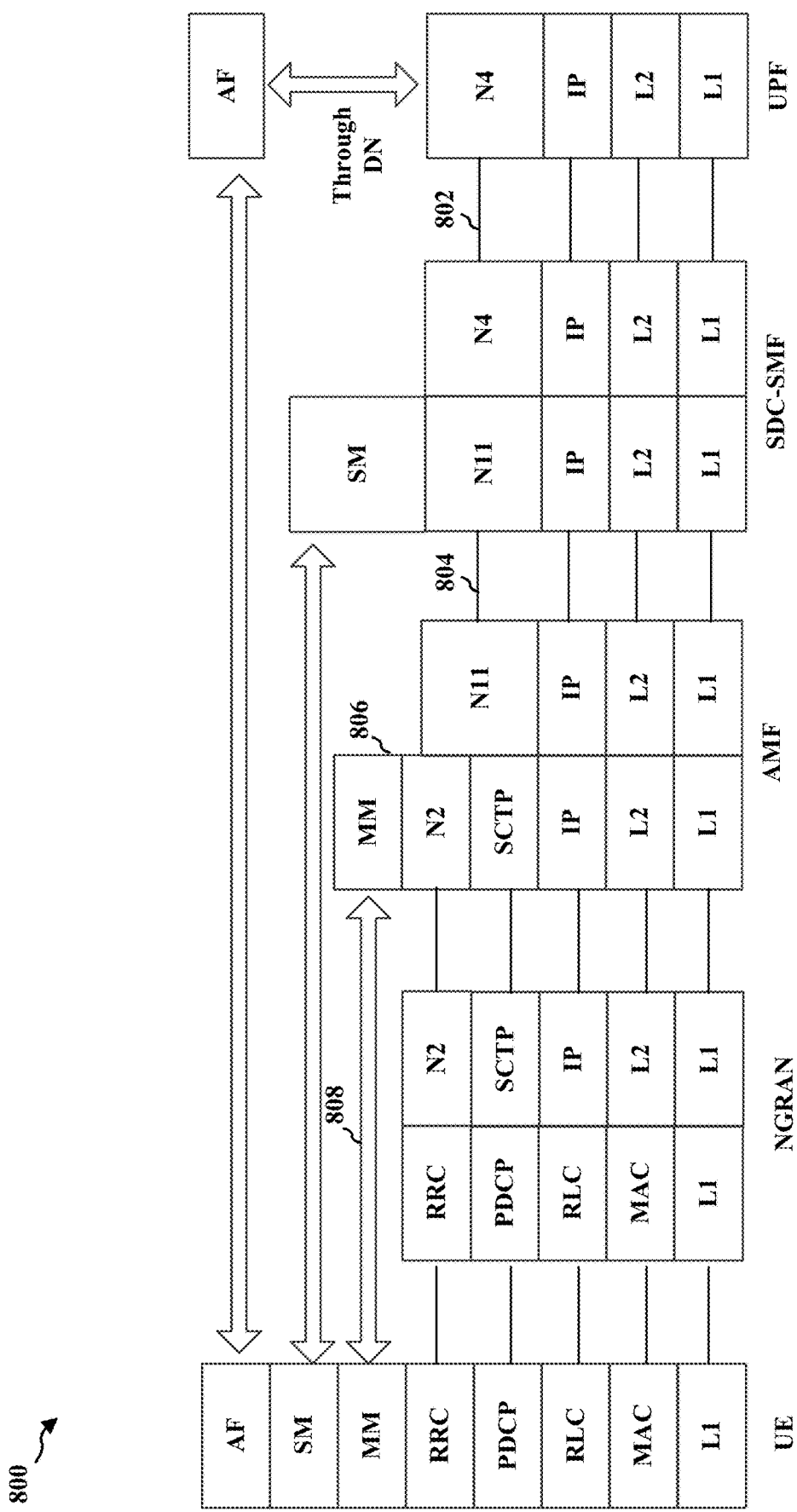
FIG. 8 illustrates an example Internet Protocol Data Delivery (IPDD) protocol stack for data delivery through an SDC-SMF.

FIG. 8 illustrates an example IP protocol stack 800 for transporting IPDD through SDC-SMF, e.g., 402, 502, 608. In FIG. 8, IP data enters the core network via the UPF (e.g., UPF 508, 620). For example, FIG. 5 illustrates IP data entering the core network via UPF 508 from DN 506. The UPF forwards the data to the SDC-SMF, e.g., via an N4 interface 802. The UPF may indicate to the SMF that the data should be sent using NAS. The SDC-SMF may perform IP header compression for the IP data. The processed data, with the compressed IP header, may then be sent as an SM payload to the AMF, e.g., via N11 interface 804 for forwarding to the UE. The data may be sent as a NAS payload in a Session Management (SM) message that is forwarded to the AMF. The AMF then forwards the NAS payload to the UE, e.g., in a Mobility Management (MM) message 808 from an MM protocol 806.

FIG. 9 illustrates an example of NIDD through SDC-SMF 902 with a configuration initiated by an AF 908. SDC-SMF 904 may correspond to SMF 402, 502, 608, for example. Although only a single AF 908 (e.g., AF 504, 616) is illustrated, data may enter a core network from multiple AFs. AFs that generate the data may need to configure the Unified Data Management (UDM) 902 to allow for transport of their data to the UE using NIDD. Therefore, FIG. 9 illustrates AF 908 sending a configuration request 901 to the NEF 906 (e.g., NEF 514). The NEF performs NEF handling in response to the configuration request and authorizes the AF using the UDM information, e.g., sending an NIDD authorization request 903 to UDM 902. UDM 902 responds to the request with an NIDD Authorization Response 905 and also provides SDC-SMF information for SDF-SMF 904 in the authorization response. The NEF 906 then forwards the SDC-SMF information for SDF-SMF 904 to the AF 908 in an NIDD configuration response 907. The AF 908 may initiate a T8 interface with the SDC-SMF indicated by the SDC-SMF information, e.g., AF 908 may send a T8 set up request 909 to SDC-SMF 904 and receive a T8 set up response 911. The SDC-SMF sends information 913 to register the AF, SDC-SMF pairing at UDM 902.

A UE may also set up PDU sessions using NIDD. FIG. 10 illustrates an example of PDU sessions set up for NIDD with UE 1002. In a first example, a UE may indicate at least a portion of data is CIoT. In a second example, the UE may include an indication in a registration request, such a flag, that indicates that the UE requires CIoT transmission and NIDD. A RAN may select an AMF for the NIDD based on the CIoT requirement indicated by the UE.

Encryption for NIDD may be performed in any of a number of ways. In a first example, NAS encryption may be used. The UE may leverage NAS encryption and integrity protection for the transmission NIDD frames. The AMF may perform encryption/decryption and integrity checks on the NAS payload. In a second example, SMF based encryption may be used. In this second example, during PDU session set up, the UE and SDC-SMF may derive a key for use with frames of the NIDD PDU session. Keying material for the PDU session may be provided to the SMF as part of the UE subscription or may be received from the AF. In another example, encryption for NIDD frames may be performed at the UPF. Keying material for the PDU session may be provided to the UPF as part of the PDU session establishment and may be derived based on authentication with the network or may be obtained from the AF.

FIG. 10 illustrates an example of NIDD connection set up for communication of NIDD between UE 1002 and AF 1016 via a core network, e.g., that comprises RAN 1004, AMF 1006, SDC-SMF 1008, PCF 1010, UDM 1012, and NEF 1014. In this Protocol Data Unit (PDU) session set up for NIDD, UE 1002 sends a PDU session request 1005 to AMF 1006 (e.g., AMF 510, 612) indicating NEF 1014 as the Access Point Name (APN), and therefore, indicating a small data session with NIDD. As illustrated in FIG. 10, an AF configuration 1001 may be established between NEF 1014 and AF 1016, e.g., prior to the request 1005. In an example in which the data is received at the SDC-SMF directly from the AF 1016, a T8 session may be set up at 1003 between AF 1016 and SDC-SMF 1008 (e.g., SDC-SMF 402, 502, 608, 904) e.g., as described in connection with FIG. 9. As illustrated in FIG. 5, a T8 interface may be established between the AF and the NEF, and a second interface may be established between the NEF and the SDC-SMF. The AMF may select, at 1007, an SDC-SMF for the PDU session with UE 1002. The SDC-SMF may be selected not just based on loading, but may also be selected based on capabilities of the SMF, e.g., based on whether the SMF is small data capable. The AMF may select the SDC-SMF 1008 based on a configuration for a corresponding AF 1016, e.g., by selecting the SDC-SMF 1008 that was configured in connection with AF 1016 when determining the SDC-SMF to be used for the PDU session requested by UE 1002. The AMF 1006 may send an indication to the selected SDC-SMF 1008 to establish a PDU session. The SDC-SMF 1008 may request subscriber data from UDM 1012, and a PDU session authentication authorization 1009 may be performed. An Nsm is established between NEF 1014 and SDC-SMF 1008 at 1011, and an N2 PDU session is established and set up at 1013. The UE 1002 may then transmit uplink data 1015 to RAN 1004 in an SM payload. RAN 1004 forwards the SM payload to AMF 1006 that forwards the SM payload to SDC-SMF 1008 for transport to AF 1016. The SDC-SMF processes the SM payload to obtain the data and sends the data to AF 1016 over the T8 interface. Similarly, downlink data 1017 may be transported from AF 1016 to SDC-SMF 1008 over T8. The SDC-SMF 1008 includes the data as an SM payload and forwards the SM payload to the AMF 1006 to be sent to UE 1002.

Figure 11:
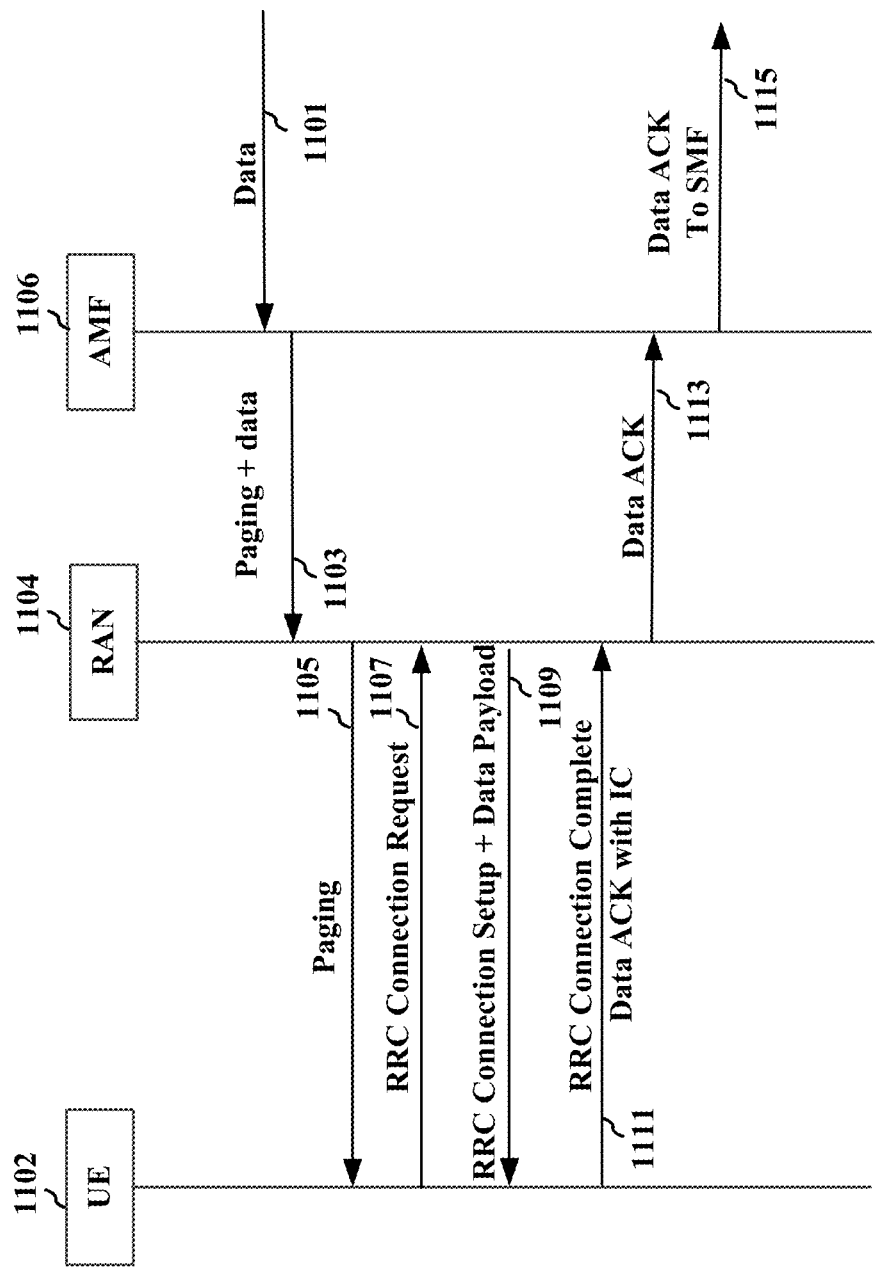
FIG. 11 illustrates an example communication flow for Mobile Terminated Data Delivery.

FIG. 11 illustrates an example of Mobile Terminated (MT) data delivery. FIG. 11 illustrates aspects in which MT data delivery with small data may be improved for UEs in idle modes, e.g., CM-IDLE/RRC-IDLE. AMF 1106 may receive a data payload 1101, e.g., from an SDC-SMF, as described in connection with FIGS. 5-10. Upon receiving the data payload 1101, the AMF 1106 may send a paging message containing the NAS SM message 1103 to the UE 1102. The RAN 1104 may store the data and send a page 1105 to the UE 1102 with an indication that the page is for small data. For example, the RAN may send an NAS MM over RRC. The UE responds with an RRC connection request 1107. The RAN node responds with RRC an connection setup 1109 and may piggyback the data (encrypted) to the UE. The data may be encrypted. The UE may decrypt the encrypted data and determine a return Message Authentication Code. The UE then sends an ACK 1111 to RAN 1104 with a PDU session ID indication. The RAN forwards the ACK 1113 to AMF, which forwards the ACK 1115 to the SMF.

Figure 13:
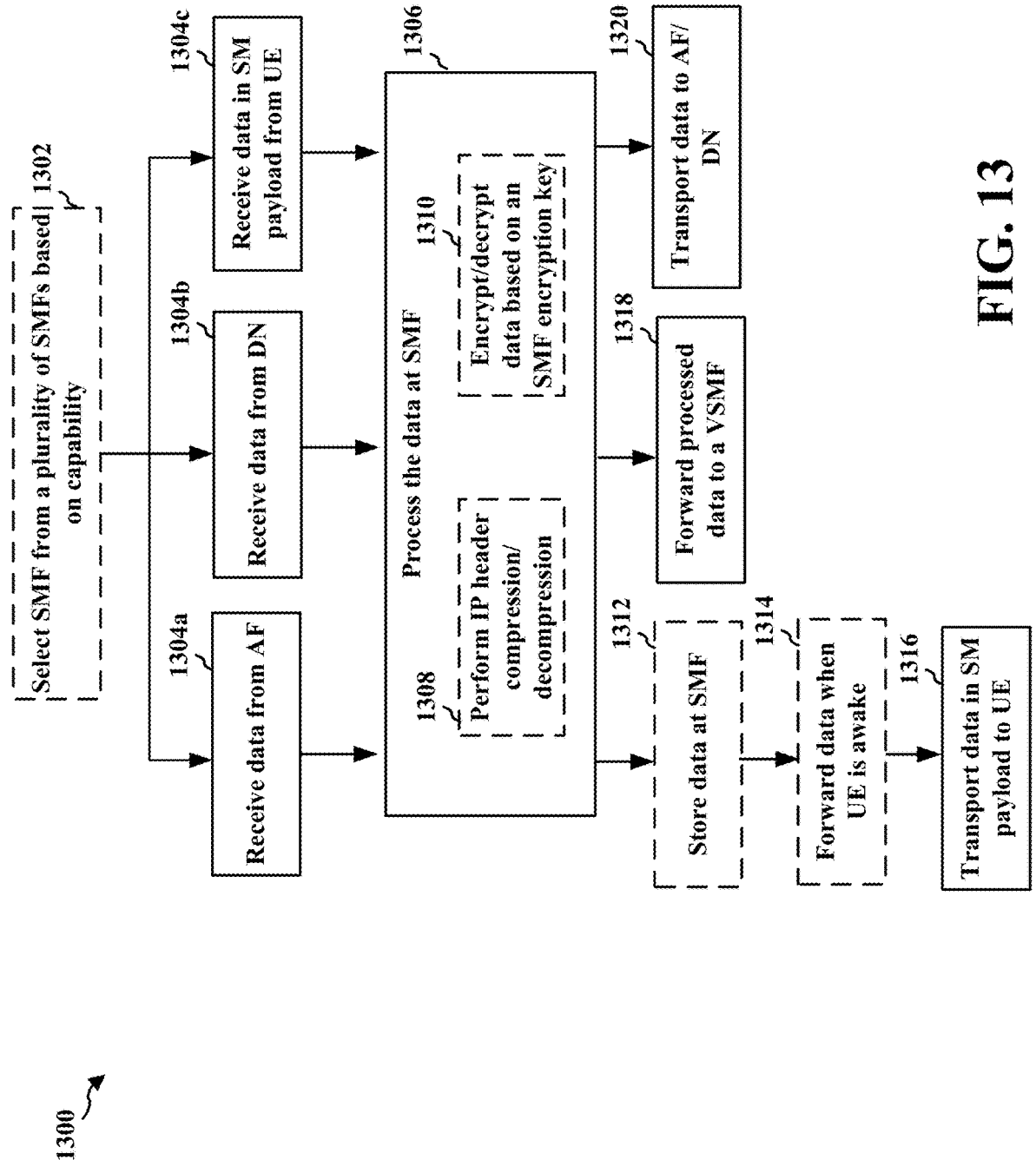
FIG. 13 is a flowchart of a method of wireless communication.

FIG. 13 is a flowchart 1300 of a method of wireless communication. The method may be performed by aspects of a core network, e.g., based on the example architectures of FIG. 5, FIG. 6, etc. Optional aspects of the method are illustrated with a dashed line. The method enables the communication of small data between a UE and network components in a manner that reduces the overhead signaling required to transport the small data.

At 1304a, 1304b, or 1304c, data is received from at least one of an AF, a DN and a user equipment. The data may comprise user data rather than control data. The data may be received by a small data capable SMF (e.g., SDC-SMF 402, 502, 608, 904, 1008). The data may comprise small data, e.g., data below a size threshold. Thus, the data may be referred to as small data and/or small user data. Then, at 1306, the SMF processes the data for transport with a low overhead, e.g., as a session management payload over an NAS protocol. The overhead is lower in overhead than the case where a service request and additional signaling procedure is required to establish a user plane connection. When going through the NAS, the establishment of the user plane is not required, thereby reducing the overhead to transport the data. The SMF may process the data for transmission to the UE. For data received from the UE, the SMF may process the data for transmission to the AF or the DN.

At 1304a, the data may be received from an AF external to the core network, e.g., via a T8 interface. In one example, the data may be received at an SMF directly from the AF, e.g., via a T8 interface. In another example, as illustrated in FIG. 5, an NEF may comprise the T8 interface with the AF and may have another interface to the SMF. Thus, the data may be received by the SMF indirectly from the AF. At 1304b, the data may be received from a DN external to the core network, e.g., via an N6 interface. As illustrated in FIG. 5, the data may be received by the SMF indirectly from the DN, e.g., via a UPF. The SMF processes the received data at 1306. For data received from the AF or the DN at 1304a/1304b, the SMF processes the data for transport to the UE. The SMF may then transport the data to the user equipment, at 1316, as an SM payload, as described in connection with FIGS. 5, 6, and 10. The SM payload, e.g., terminates within the session management functionality of the UE. One example would be an IP address assigned to the UE. However, when the SM payload is user data, the session management function in the UE may strip out the data and forward the data to the application stack in the UE. The data may be transmitted to the user equipment via an AMF, e.g., as described in connection with FIGS. 5, 6, and 10.

At 1304c, the data may be received in an SM payload from the user equipment. In this example the SMF processes the data for transport to the AF or to the DN. Then, the SMF may transport the data to the AF or to the DN, at 1320, e.g., after processing the SM payload to obtain the data. The SMF may terminate a T8 interface for the data entering the core network from an AF, e.g., as in the examples illustrated in FIGS. 5 and 6. As well, the NEF may terminate the T8 interface for the data entering the core network from the AF, e.g., as illustrated in FIGS. 5 and 6.

The data may be processed at the SMF at 1306 based on a configuration of a sender of the data. The data may be processed at 1306 to be transmitted in a manner specific to small data, e.g., data below a threshold size. Thus, the data may be processed due to the data being small data and/or when the sender has an appropriate configuration.

Thus, in the example in which the data is received from an AF at 1304a or a DN at 1304b, the small data may be processed for transport to the UE at 1316, e.g., as an SM payload. The SMF may perform IP compression, e.g., IP header compression at 1308. Similarly, when the data is received from the UE and is directed to the DN, the SMF may perform IP header decompression, at 1308, before transporting the data to the DN, e.g., via a UPF.

Figure 16:
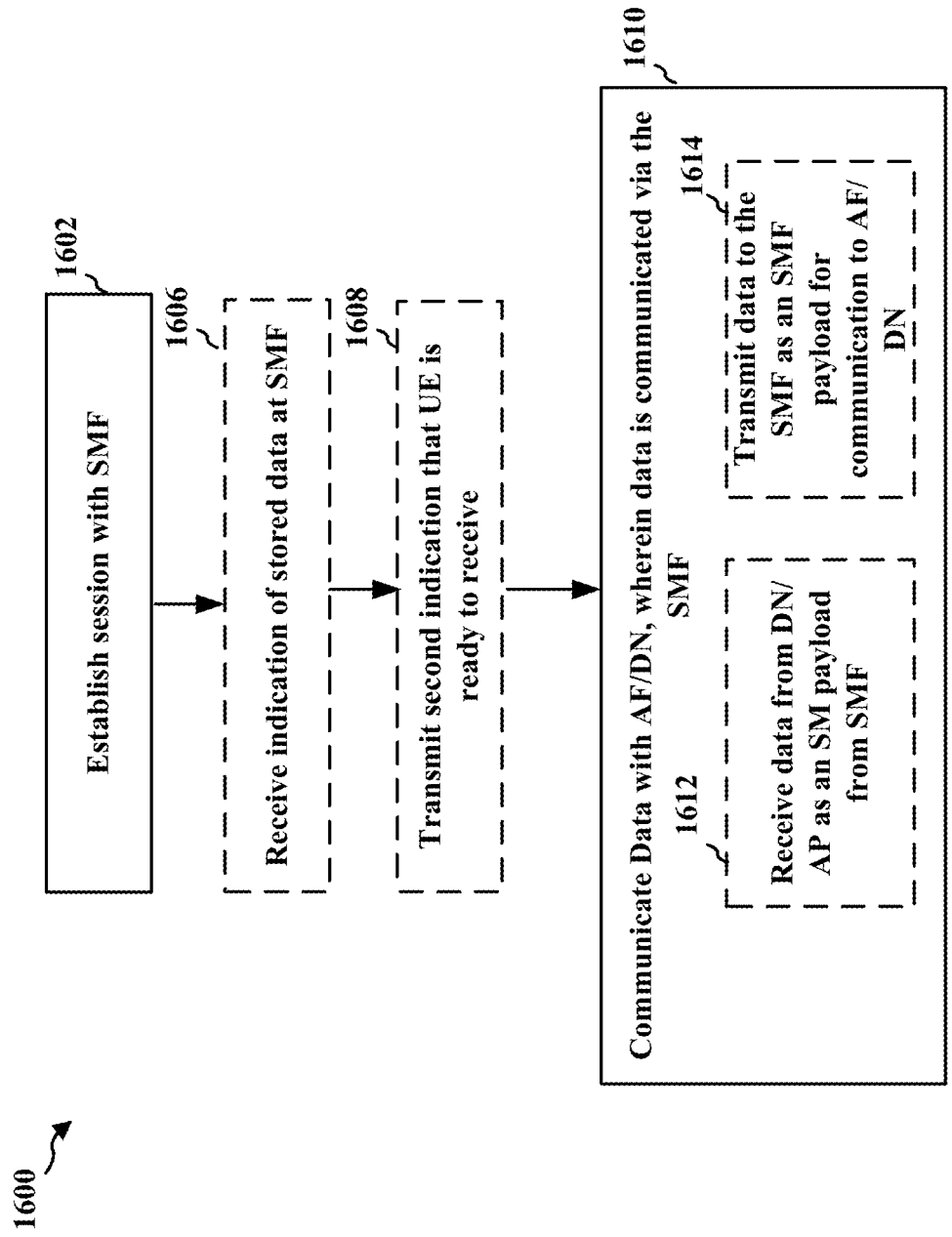
FIG. 16 is a flowchart of a method of wireless communication.

At times, the UE may be in an idle mode or other low power mode, in which the UE is not actively receiving transmissions. The SMF may store the data at 1312 when the user equipment is in an idle mode. An idle mode may include when the UE is in an RRC idle mode, a Connected Mode (CM) idle, etc. Then, at 1314, the UE may forward the data to the user equipment from the SMF when the user equipment is in an awake mode, e.g., when the UE is in an RRC connected mode, CM connected mode, etc. For example, the UE may be considered to be in an awake mode when the AMF does not need to page UE to communicate with the UE. The network may receive an indication from the UE indicating that the UE is ready to receive the data. The indication may trigger the SMF to transport the data to the UE. FIG. 16 illustrates an example of storage of data and later communication with a UE when the UE is in an idle mode.

As illustrated at 1310, the SMF may encrypt the data based on an SMF encryption key, wherein the SMF encryption key comprises a shared key between the user equipment and the SMF.

As in the example illustrated in FIG. 6, the SMF may comprise a H-SMF. Thus, at 1318, the SMF may forward the processed data to a V-SMF for transmission to the user equipment. The SMF may perform the processing prior to providing the data to the V-SMF. In other examples, the SMF may be the V-SMF and may perform the processing of the data after received from an H-SMF and prior to transporting the data to the UE.

The method may further include selecting the SMF from a plurality of SMFs at 1302, e.g., based on a capability of the SMF to process the data. For example, the AMF may select the SMF for a PDU session, e.g., as described in connection with FIG. 10. In another example, the SMF may be selected by an NEF (e.g., 514, 906, 1014).

Figure 14:
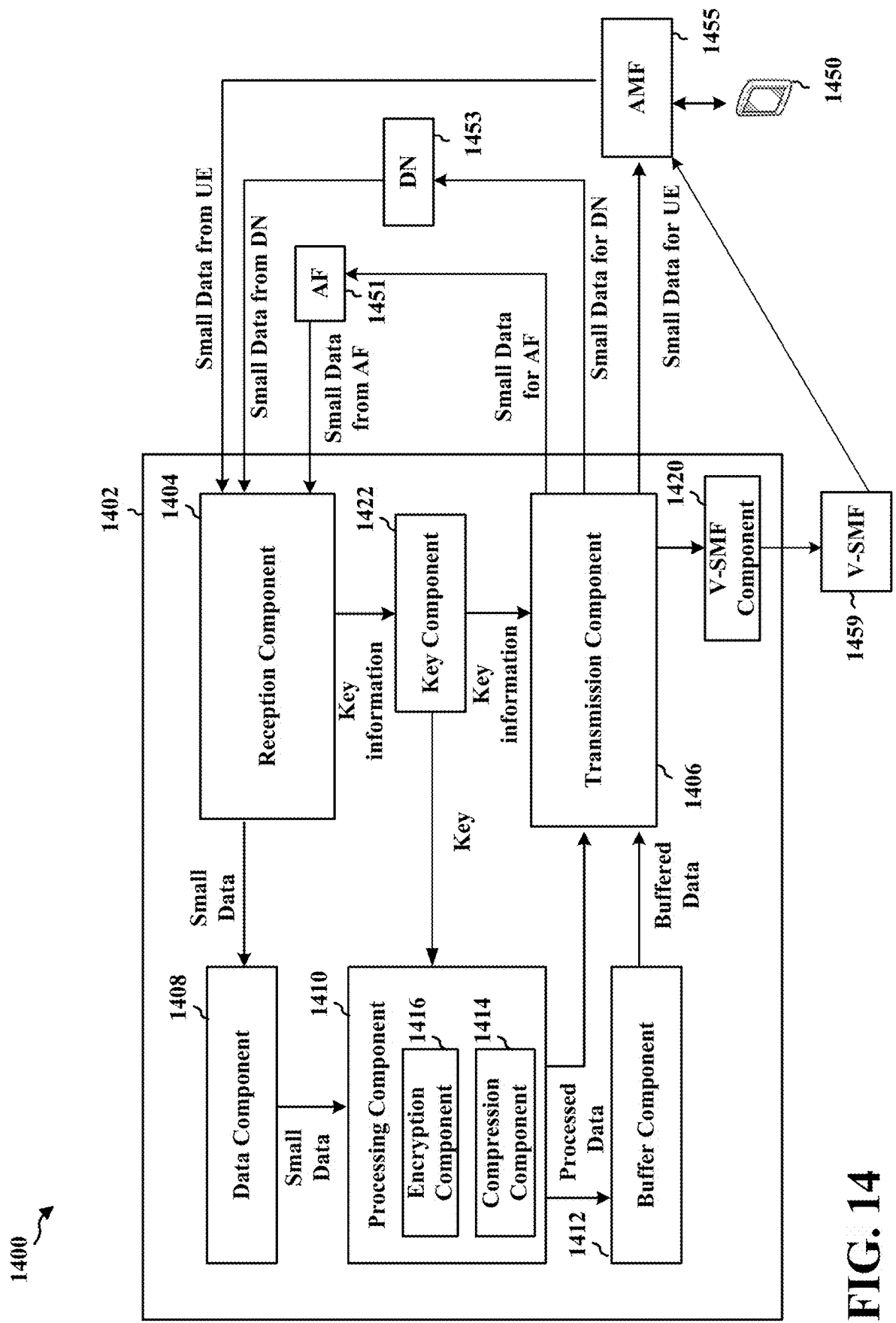
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a core network component, e.g., an SMF (e.g., e.g., SDC-SMF 402, 502, 608, 904, 1008. The apparatus includes a reception component 1404 that receives communication, e.g., from other network components and/or from UE(s) 1450. The apparatus includes a data component 1408 configured to receive user data below a size threshold from at least one of an AF 1541, a DN 1453, or a UE 1450. The apparatus includes a processing component 1410 configured to process the data at an SMF for transport with a low overhead as a session management payload over a NAS protocol. The apparatus includes a transmission component 1406 configured to transport the data, e.g., from the SMF to the UE 1450 as a SM payload. The data may be transmitted to the UE 1450 via an AMF 1455. The apparatus may include a buffer component 1412 configured to store the data, e.g., at the SMF, for the UE 1450 when the UE 1450 is in an idle mode. Then, the transmission component 1406 may forward the data to the user equipment from the SMF when the UE 1450 is in an awake mode. The data may be received at the data component 1408 in an SM payload from the UE 1450. In this example, the transmission component 1406 may be configured to transport the data, e.g., from the SMF, to the AF 1451 or the DN 1453. The processing component 1410 may comprise a compression component 1414 configured to perform IP header compression on the data, e.g., at the SMF. The processing component 1410 may comprise an encryption component 1416 configured to encrypt data with an SMF encryption key, wherein the SMF encryption key comprises a shared key between the user equipment and the SMF, e.g., as determined by key component 1422. The apparatus may be comprised in or may comprise a home SMF. Thus, the apparatus may comprise a V-SMF component 1420 configured to forward the processed data to a visitor SMF 1459 for transmission to the UE 1450. Another network component, such as an AMF 1455 may be configured to select the SMF from a plurality of SMFs based on a capability of the SMF to process the data. In another example, the SMF may be selected by an NEF.

The apparatus/core network may include components that perform each of the blocks of the algorithm in the aforementioned flowcharts of FIG. 9, 10, 11, or 13. As such, each block in the aforementioned flowcharts of FIG. 9, 10, 11, or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
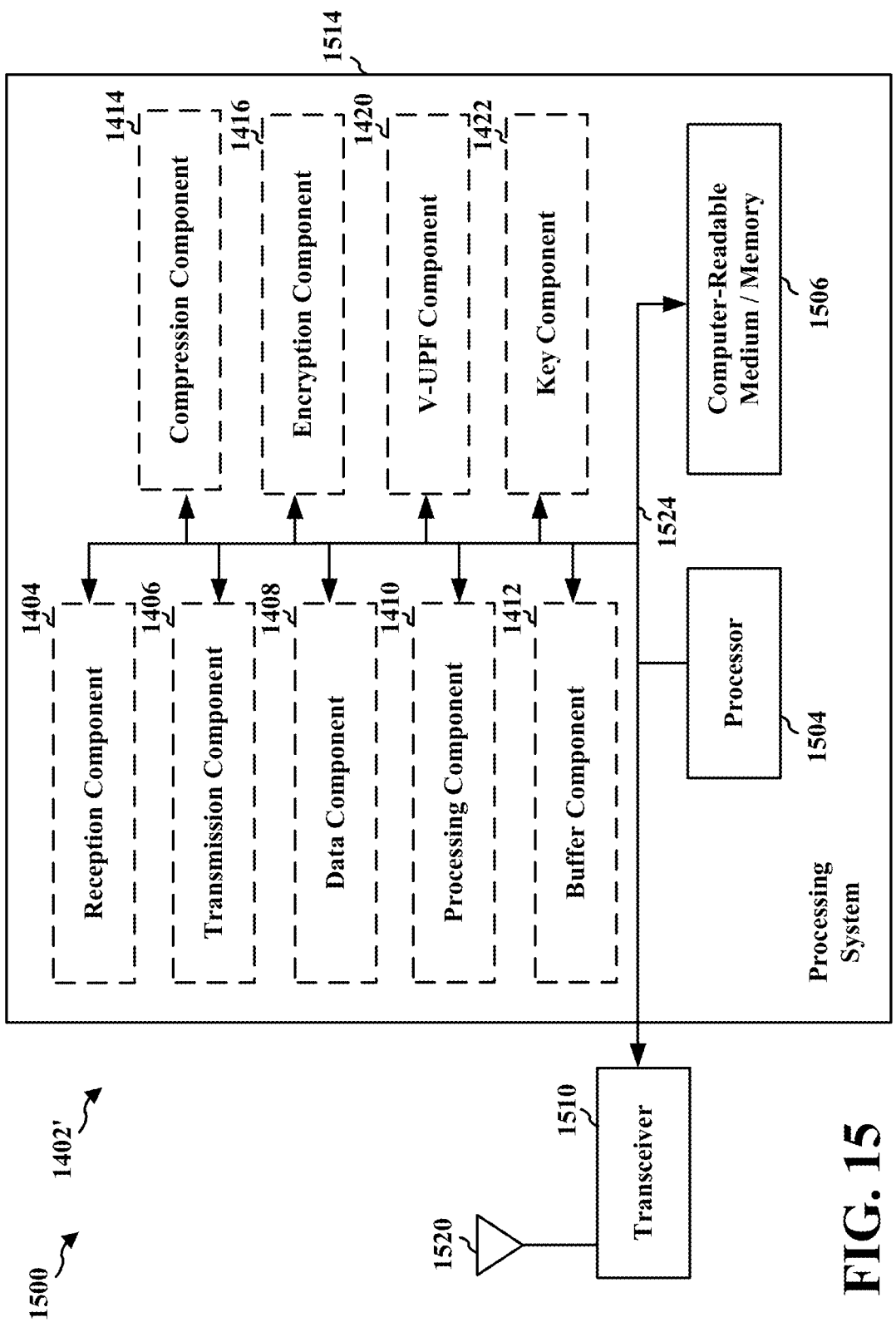
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, 1420, 1422, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416, 1420, 1422. The components may be software components running in the processor 1504, resident/stored in the computer readable medium/memory 1506, one or more hardware components coupled to the processor 1504, or some combination thereof. The processing system 1514 may be a component of the core network and may include the memory and/or at least one of the TX processor, the RX processor, and the controller/processor.

In one configuration, the core network for wireless communication may include means for receiving user data below a size threshold from at least one of an AF, a DN, and a user equipment; means for processing the data at an SMF for transport with a low overhead as a session management payload over a NAS protocol; means for transporting the data from the SMF to the user equipment as an SM payload; means for transporting the data from the SMF to the AF; means for performing IP header compression on the data by the SMF; means for storing the data at the SMF for the user equipment when the user equipment is in an idle mode;

means for forwarding the data to the user equipment from the SMF when the user equipment is in an awake mode; means for encrypting data by the SMF with an SMF encryption key; means for forwarding the processed data to a visitor SMF for transmission to the user equipment; and means for selecting the SMF from a plurality of SMFs based on a capability of the SMF to process the data. The aforementioned means may be one or more of the aforementioned components of the apparatus 1402/1402' or core network and/or a processing system 1514 of the apparatus 1402/1402' configured to perform the functions recited by the aforementioned means. As described supra, the processing system 1514 may include a TX Processor, the RX Processor, and the controller/processor. As such, in one configuration, the aforementioned means may be the TX Processor, the RX Processor, and the controller/processor configured to perform the functions recited by the aforementioned means.

FIG. 16 is a flowchart 1600 of a method of wireless communication. The method may be performed by a UE (e.g., UE 104, 350, 512, 604, 1002, 1102, the apparatus 1702, 1702'). Optional aspects are illustrated with a dashed line. The method may enable the UE to send and/or receive small data in a manner that reduces the overhead signaling requirements for the UE to transmit/receive the small data.

At 1602, the UE establishes a session with an SMF (e.g., SDC-SMF 402, 502, 608, 904, 1008) for the communication of user data below a size threshold. At 1610, the UE communicates data with at least one of an AF, a DN, wherein the data is communicated with the SMF for transport with a low overhead as a session management payload over an NAS protocol.

The communicating the data at 1610 may include receiving the data at 1612 from the AF or the DN as a SM payload received from the SMF. The SM payload, e.g., terminates within the session management functionality of the UE. When the SM payload is user data, the session management function in the UE may strip out the data and forward the data to the application stack in the UE. In another example, the communicating the data at 1610 may include transmitting at 1614 the data to the SMF as a SM payload for transport to the AF or the DN.

The SMF may buffer data for a UE in an idle mode, e.g., RRC idle, CM idle, etc. Therefore, the UE may receive an indication of stored data for the user equipment at the SMF at 1606. At 1608, the UE may transmit a second indication that the UE is ready to receive the stored data. Then, the UE may receive the data from the SMF, e.g., at 1612 in response to the second indication.

The data may comprise encrypted data encrypted based on an SMF encryption key, wherein the SMF encryption key comprises a shared key between the user equipment and the SMF.

Figure 17:
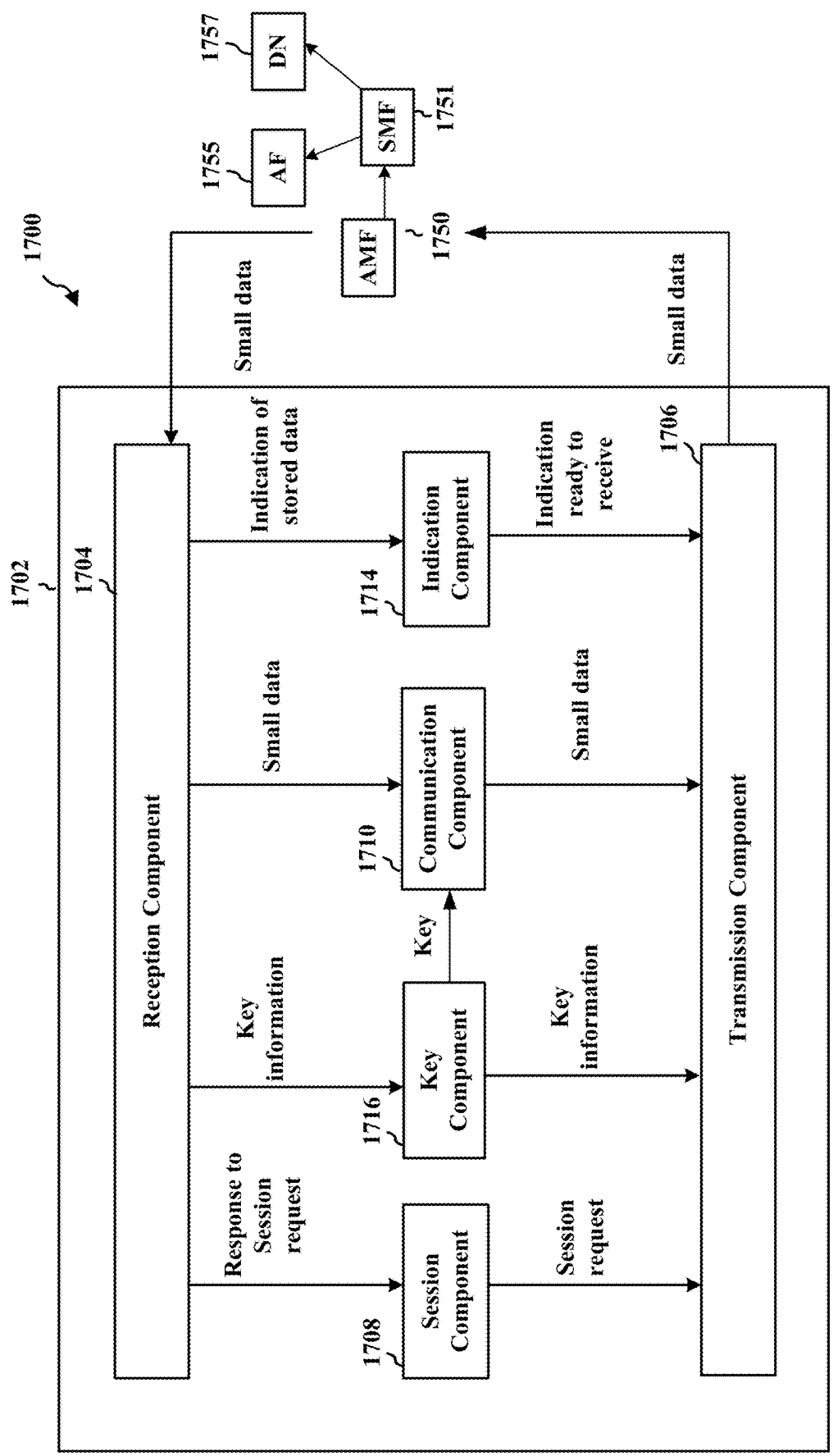
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be a UE (e.g., UE 104, 350, 512, 604, 1002, 1102, the apparatus 1702, 1702'). The apparatus includes a session component 1708 configured to establish a session with an SMF 1751 for communication of user data below a size threshold, e.g., by transmitting a session request. The apparatus includes a communication component 1710 configured to communicate with at least one of an AF 1755 or a DN 1757, wherein the data is communicated with the SMF for transport with a low overhead as an SM payload over a NAS protocol. The communication component 1710 may receive, via reception component 1704, the data from the AF or the DN as the SM payload received from the SMF and/or may transmit the data, via transmission component 1706, to the SMF as the SM payload for transport to the AF or the DN. The apparatus may comprise an indication component 1714 configured to receive an indication of stored data for the user equipment at the SMF and to transmit a second indication that the UE is ready to receive the stored data. The reception component and communication component 1710 may be configured to receive the data from the SMF 1751 in response to the second indication. The data may comprise encrypted data encrypted based on an SMF encryption key, wherein the SMF encryption key comprises a shared key between the user equipment and the SMF. Thus, the apparatus may comprise a key component 1716 configured to exchange key information with the SMF 1751. The data may be communicated with the SMF 1751 via AMF 1750.

The UE may include components that perform aspects of the algorithm in the aforementioned flowcharts of FIGS. 9-11 and 16. As such, blocks in the aforementioned flowcharts of FIGS. 9-11 and 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
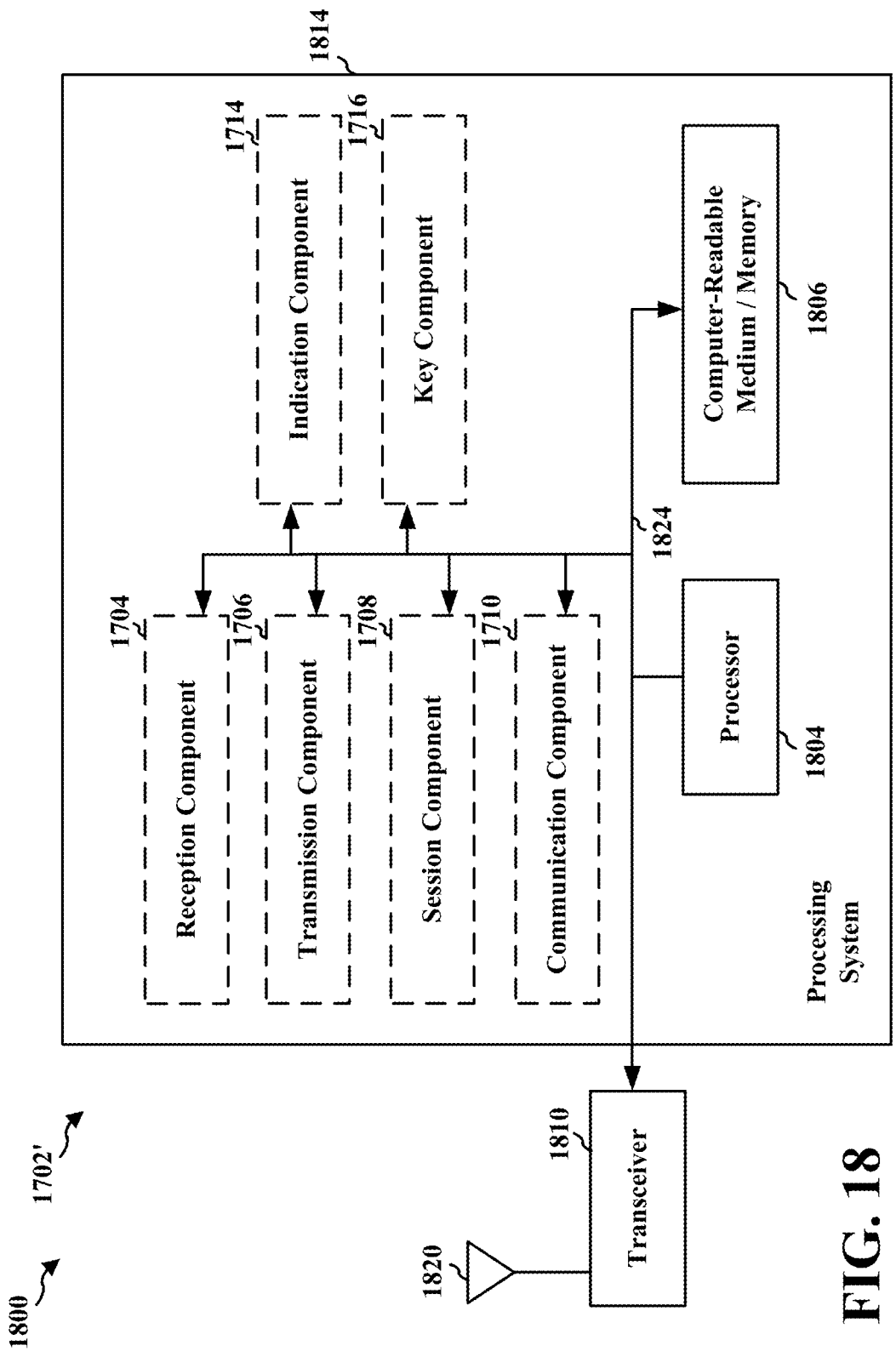
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1714, 1716, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1714, 1716. The components may be software components running in the processor 1804, resident/stored in the computer readable medium/memory 1806, one or more hardware components coupled to the processor 1804, or some combination thereof. The processing system 1814 may be a component of the UE 350 and may include the memory 360 and/or at least one of the TX processor 368, the RX processor 356, and the controller/processor 359.

In one configuration, the UE for wireless communication may include means for establishing a session with an SMF, means for communicating user data below a size threshold with at least one of an AF or a DN, wherein the data is communicated with the SMF for transport with a low overhead as an SM payload over an NAS protocol, means for receiving the data from the AF or the DN as the SM payload received from the SMF, means for transmitting the data to the SMF as an SM payload for transport to the AF or the DN, means for receiving an indication of stored data for the user equipment at the SMF, means for transmitting an second indication that the UE is ready to receive the stored data, and means for receiving the data from the SMF in response to the second indication. The aforementioned means may be one or more of the aforementioned components of the apparatus 1702 and/or a processing system 1814 of the apparatus 1702' configured to perform the functions recited by the aforementioned means. As described supra, the processing system 1814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Aspects may include a processing system includes a processor coupled to a computer-readable medium/memory. The processor may be responsible for general processing, including the execution of software stored on the computer-readable medium/memory. The software, when executed by the processor, causes the processing system to perform the various functions described supra for any particular apparatus. The computer-readable medium/memory may also be used for storing data that is manipulated by the processor when executing software. It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving user data below a size threshold from at least one of an Application Function (AF), a Data Network (DN) or a user equipment;
   processing the user data and performing Internet Protocol (IP) header compression or decompression for the user data at a session management function (SMF) for transport of the user data as a session management payload over a Non Access Stratum (NAS) protocol; and
   forwarding the user data as the session management payload via an Access and Mobility Management Function (AMF).

2. The method of claim 1, wherein the user data is received from the DN, the method further comprising:
   transporting the user data from the SMF to the user equipment as the session management payload.

3. The method of claim 1, further comprising:
   performing encryption or decryption of the session management payload at the AMF prior to forwarding the user data as the session management payload.

4. The method of claim 1, further comprising:
   storing the user data at the SMF for the user equipment when the user equipment is in an idle mode; and
   forwarding the user data to the user equipment from the SMF when the user equipment is in an awake mode.

5. The method of claim 1, wherein the user data is received from the AF, the method further comprising:
   transporting the user data from the SMF to the user equipment as the session management payload.

6. The method of claim 5, wherein the user data is transmitted to the user equipment via an Access and Mobility Management Function (AMF).

7. The method of claim 1, wherein the user data is received in a Session Management (SM) payload from the user equipment, the method further comprising:
   transporting the user data from the SMF to the AF or the DN.

8. The method of claim 1, further comprising:
   encrypting the user data by the SMF with an SMF encryption key, wherein the SM F encryption key comprises a shared key between the user equipment and the SMF.

9. The method of claim 1, wherein the SMF comprises a home SMF, the method further comprising:

forwarding processed user data from the home SMF to a visitor SMF for transmission to the user equipment.

10. The method of claim 1, further comprising:
selecting the SMF from a plurality of SMFs based on a capability of the SMF to process the user data.

11. The method of claim 10, wherein the SMF is selected by a Network Exposure Function (NEF), the method further comprising:
transporting the user data from the SMF selected by the NEF to the user equipment.

12. The method of claim 10, wherein the SMF is selected by an Access and Mobility Management Function (AMF), the method further comprising:
transporting the user data from the SMF selected by the AMF to the AF or the DN.

13. An apparatus for wireless communication, comprising:
a memory; and
at least one processor coupled to the memory and configured to:
receive user data below a size threshold from at least one of an Application Function (AF), a Data Network (DN) or a user equipment;
process the user data and perform Internet Protocol (IP) header compression or decompression for the user data at a session management function (SMF) for transport of the user data as a session management payload over a Non Access Stratum (NAS) protocol; and
forwarding the user data as the session management payload via an Access and Mobility Management Function (AMF).

14. The apparatus of claim 13, wherein the user data is received from the DN, and wherein the at least one processor is further configured to:
transport the user data from the SMF to the user equipment as the session management payload.

15. The apparatus of claim 13, wherein the at least one processor is further configured to:
store the user data at the SMF for the user equipment when the user equipment is in an idle mode; and
forward the user data to the user equipment from the SMF when the user equipment is in an awake mode.

16. The apparatus of claim 13, wherein the data is received from the AF, and wherein the at least one processor is further configured to:
transport the user data from the SMF to the user equipment as the session management payload.

17. The apparatus of claim 13, wherein the user data is received in a Session Management (SM) payload from the user equipment, wherein the at least one processor is further configured to:
transport the user data from the SMF to the AF or the DN.

18. The apparatus of claim 13, wherein the at least one processor is further configured to:
encrypt the user data by the SMF with an SMF encryption key, wherein the SMF encryption key comprises a shared key between the user equipment and the SMF.

19. The apparatus of claim 13, wherein the SMF comprises a home SMF, wherein the at least one processor is further configured to:
forward processed user data from the home SMF to a visitor SMF for transmission to the user equipment.

20. The apparatus of claim 13, wherein the at least one processor is further configured to:
select the SMF from a plurality of SMFs based on a capability of the SMF to process the user data.

21. The apparatus of claim 13, wherein the at least one processor is further configured to:
perform encryption or decryption of the session management payload at the AMF prior to forwarding the user data as the session management payload.

22. An apparatus for wireless communication, comprising:
means for receiving user data below a size threshold from at least one of an Application Function (AF), a Data Network (DN) or a user equipment;
means for processing the user data and performing Internet Protocol (IP) header compression or decompression for the user data at a session management function (SMF) for transport of the user data as a session management payload over a Non Access Stratum (NAS) protocol; and
means for forwarding the user data as the session management payload via an Access and Mobility Management Function (AMF).

23. The apparatus of claim 22, wherein the user data is received from the DN, the apparatus further comprising:
means for transporting the user data from the SMF to the user equipment as the session management payload.

24. The apparatus of claim 22, further comprising:
means for performing encryption or decryption of the session management payload at the AMF prior to forwarding the user data as the session management payload.

25. The apparatus of claim 22, further comprising:
means for storing the user data at the SMF for the user equipment when the user equipment is in an idle mode; and
means for forwarding the user data to the user equipment from the SMF when the user equipment is in an awake mode.

26. The apparatus of claim 22, wherein the user data is received from the AF, the apparatus further comprising:
means for transporting the user data from the SMF to the user equipment as the session management payload.

27. The apparatus of claim 26, wherein the user data is transmitted to the user equipment via an Access and Mobility Management Function (AMF).

28. The apparatus of claim 22, wherein the user data is received in a Session Management (SM) payload from the user equipment, the apparatus further comprising:
means for transporting the user data from the SMF to the AF or the DN.

29. The apparatus of claim 22, further comprising:
means for encrypting the user data by the SMF with an SMF encryption key, wherein the SMF encryption key comprises a shared key between the user equipment and the SMF.

30. The apparatus of claim 22, wherein the SMF comprises a home SMF, the apparatus further comprising:
means for forwarding processed user data from the home SMF to a visitor SMF for transmission to the user equipment.

31. The apparatus of claim 22, further comprising:
means for selecting the SMF from a plurality of SMFs based on a capability of the SMF to process the user data.

32. The apparatus of claim 31, wherein the SMF is selected by a Network Exposure Function (NEF), the apparatus further comprising:
means for transporting the user data from the SMF selected by the NEF to the user equipment.

33. The apparatus of claim 31, wherein the SMF is selected by an Access and Mobility Management Function (AMF), the apparatus further comprising:
 means for transporting the user data from the SMF selected by the AMF to the AF or the DN.

34. A non-transitory computer-readable medium storing computer executable code for wireless communication, comprising code to:
 receive user data below a size threshold from at least one of an Application Function (AF), a Data Network (DN) or a user equipment;
 process the user data and performing Internet Protocol (IP) header compression or decompression for the user data at a session management function (SMF) for transport of the user data as a session management payload over a Non Access Stratum (NAS) protocol; and
 forward the user data as the session management payload via an Access and Mobility Management Function (AMF).

* * * * *